(12) United States Patent
Ruellan et al.

(10) Patent No.: US 8,706,884 B2
(45) Date of Patent: Apr. 22, 2014

(54) METHOD AND SYSTEM FOR GENERATING AND USING AN AUGMENTED BLOOM FILTER

(75) Inventors: Herve Ruellan, Rennes (FR); Romain Bellessort, Rennes (FR); Youenn Fablet, La Dominelais (FR)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 13/527,298

(22) Filed: Jun. 19, 2012

(65) Prior Publication Data

US 2013/0339526 A1 Dec. 19, 2013

(51) Int. Cl.
*G06F 15/16* (2006.01)

(52) U.S. Cl.
USPC ............ 709/226; 713/167; 382/100; 718/102

(58) Field of Classification Search
USPC ............ 709/226; 718/102; 713/167; 382/100
See application file for complete search history.

(56) References Cited

U.S. PATENT DOCUMENTS

| 5,006,978 | A  | * | 4/1991  | Neches ........................ 718/102 |
| 6,782,116 | B1 | * | 8/2004  | Zhao et al. ................... 382/100 |
| 7,630,511 | B2 | * | 12/2009 | Zhao et al. ................... 382/100 |
| 2002/0156737 | A1 | * | 10/2002 | Kahn et al. ...................... 705/51 |
| 2003/0115143 | A1 | * | 6/2003  | Kahn et al. ...................... 705/51 |
| 2004/0064692 | A1 | * | 4/2004  | Kahn et al. .................... 713/167 |
| 2005/0025338 | A1 | * | 2/2005  | Zhao et al. ................... 382/100 |

\* cited by examiner

*Primary Examiner* — Tammy Nguyen
(74) *Attorney, Agent, or Firm* — Canon U.S.A., Inc., IP Division

(57) ABSTRACT

The present invention relates to an augmented data structure representing the availability of resources in a communication device, such as an augmented Bloom filter. A method of generating and using the augmented data structure comprises: providing first and additional groups of resources available in the same communication device; providing one or more hash functions for each of the first and additional groups, and calculating one or more hash values for each resource using the one or more corresponding hash functions; mapping each obtained hash value onto one entry of a data structure, wherein the hash values obtained from a resource of the first group are mapped onto a first subpart of the data structure only, such as a conventional Bloom array, and the hash values obtained from a resource of an additional group are mapped onto a portion of the data structure including the first subpart and an additional subpart.

20 Claims, 7 Drawing Sheets

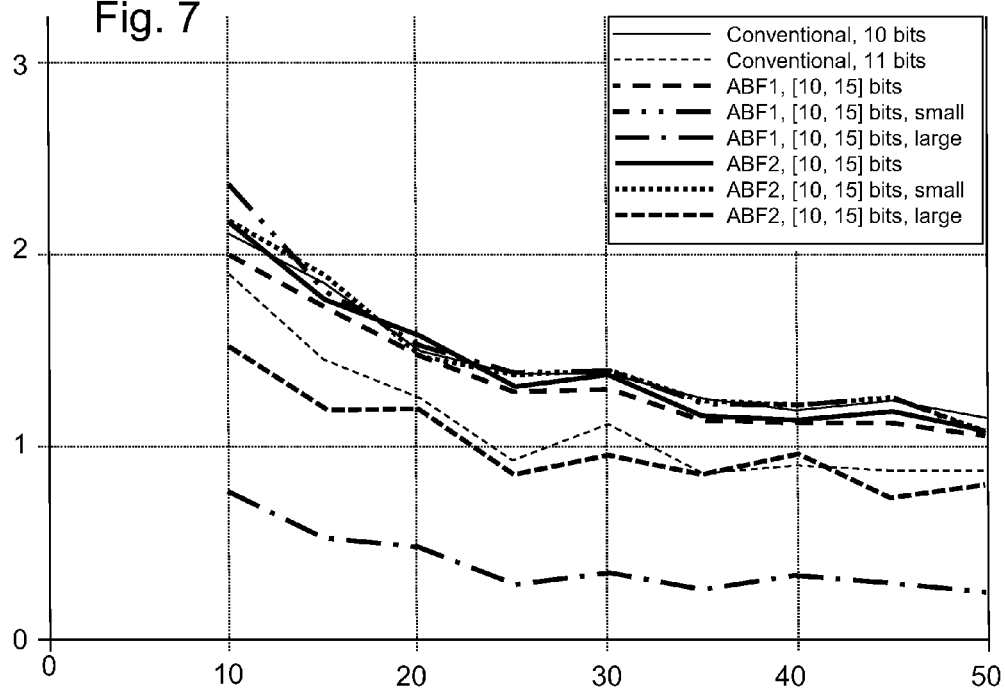
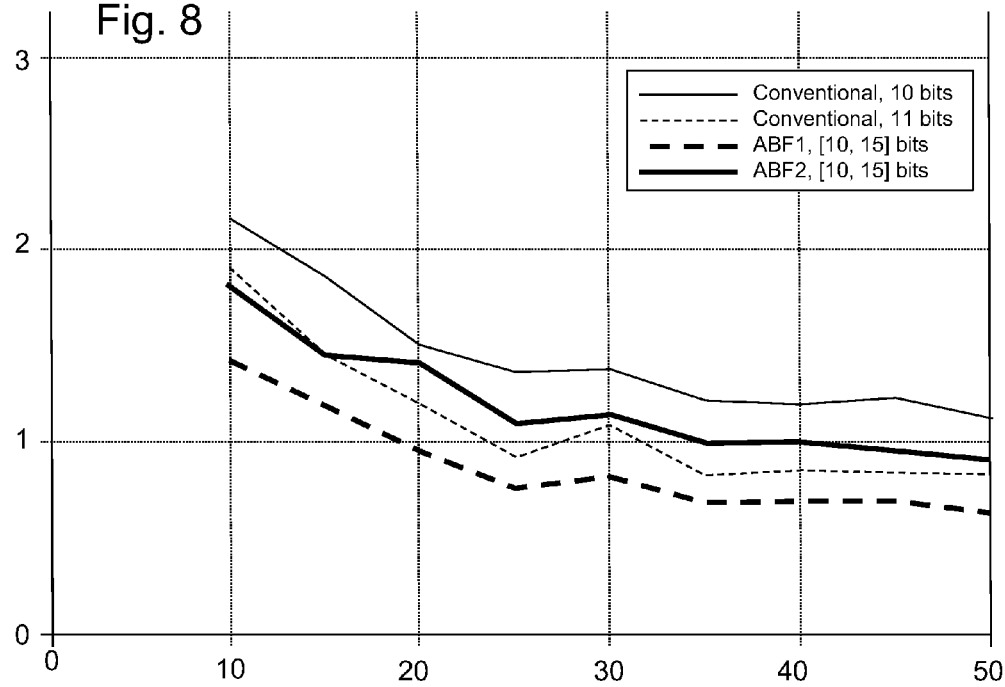

METHOD AND SYSTEM FOR GENERATING AND USING AN AUGMENTED BLOOM FILTER

FIELD OF THE INVENTION

The present invention relates in general to the use of cache information in network communication and in particular, to generating and using an augmented data structure representing the availability of resources in a communication device.

BACKGROUND OF THE INVENTION

Information about the availability of resources in a communication device is currently used to optimize exchange of digital resources between communication devices.

This is for example the case for caching web proxies that work cooperatively. Each caching web proxy caches a set of digital resources in cache memories and shares its cache information with the other caching web proxies. Then, when a caching web proxy receives a request for a digital resource not stored in its cache memories, it can use the information about the availability of resources in the other caching web proxies to select one of them to handle the request, avoiding requesting each of the other caching web proxies.

Information about the availability of resources in a communication device is generally implemented through a Bloom filter.

A Bloom filter is a compact data structure for a probabilistic representation of a set of elements. In the example above, the elements are the digital resources hosted by the communication device.

Bloom filter theory is for example disclosed in "*Less hashing, same performance: Building a better bloom filter*" (A. Kirsch and M. Mitzenmacher, Random Structures & Algorithms 33, no. 2 (2008), pp. 187-218).

A Bloom filter representing a set enables to check whether an element is member of the set. For an element member of the set, the Bloom filter will always return the correct result, i.e. that the element is a member of the set. That means that false negatives are not possible. However, for an element not member of the set, the Bloom filter may wrongly return, with a low probability, that the element is a member of the set. That means that false positives are possible. The probability for a Bloom filter to return a false positive is its error rate.

A Bloom filter of size m is composed of k hash functions having values in the range [0 μm−1] and of an array of m Boolean values. m should be greater than k, generally m>>k. For example m=18 and k=3.

To store an element, such as a digital resource, in the Bloom filter, the k hash functions are applied to it to obtain k hash values $v_1, \ldots, v_k$. Then, for each value $v_i$, the corresponding Boolean value in the array is set to 'true', i.e. the Boolean value having the index $v_i$ in the array: in other words, the Boolean value at index $v_1$ in the array is set to 'true'; the Boolean value at index $v_2$ in the array is set to 'true'; and so on.

Another element may be added to the Bloom filter by again setting the Boolean values at index $v_i$ (calculated for that specific element) to 'true'. Of course, some of these Boolean values may already be set to 'true' due to the previous addition of others elements.

Based on a Bloom filter so constructed, the presence of an element in the set represented by the Bloom filter can be tested. To do so, the k hash functions are applied to the element to test, to obtain k hash values $v_1, \ldots, v_k$. Then, for each value $v_i$, the corresponding Boolean value in the array (Boolean value at index $v_i$) is retrieved.

If all Boolean values at index $v_i$ (i=1 . . . k) have the value 'true', then the Bloom filter returns that the element to test belongs to the set it represents. However, there is a probability that this result is false: a Bloom filter can return a false positive. This is because the Boolean values at index $v_i$ (i=1 . . . k) for the tested element can have been set to 'true' to represent some elements members of the set. In general, with a correctly configured Bloom filter, the rate or probability of false positive is quite low.

Otherwise (if any one of these Boolean values is not 'true'), the Bloom filter returns that the element to test does not belong to the set its represents. In such a case, the result is always correct: a Bloom filter never returns a false negative. This is because if at least one of the Boolean values is not 'true', then the tested element has not been added to the Bloom filter.

An issue pointed out by the invention regards the probability of false positive, i.e. of error that an element is detected to be in the set whereas it is not in the set.

A mathematical study of Bloom filters show that the probability of false positive for a Bloom filter storing n elements is roughly equal to:

$$p \approx (1-e^{-kn/m})^k$$

This formula enables computation of the optimal number k of hash functions to use for minimizing this value when n and m are given:

$$k = \frac{m}{n} \ln 2$$

Using this value, the probability of false positive can be estimated as:

$$p \approx 2^{-k}$$

For example, when using 10 bits per element (n elements represented by n*10 bits or Boolean values), the number of hash function should be chosen close to:

$$k = 10 \ln 2 \approx 6.93$$

Using k=7 hash functions leads to a false-positive rate of:

$$p \approx 2^{-7} \approx 0.008$$

This means that with 10 bits per element, the false-positive error rate is below 1%.

As introduced above, Bloom filters are used by cooperative caching web proxies to share their caching content. The publication "*Cache digests*" (A. Rousskov and D. Wessels, *Computer Networks and ISDN Systems* 30, no. 22-23 (1998), pp. 2155-2168) gives an overview of this sharing of caching content.

Each caching web proxy creates a cache digest, i.e. values resulting from hash functions, which represents the content of its cache memories using a Bloom filter.

The caching web proxies share their cache digest with the other cooperative caching web proxies.

On receiving a request for a resource not in its cache memories, a caching web proxy uses the cache digest of the other caching web proxies to check whether any of them has that requested resource in its cache memories. If so, the request is sent to the caching web proxy caching the requested resource.

In this way, the number of requests between proxies is greatly reduced, saving network bandwidth.

A false positive happens with a probability of p. A false positive means that a caching web proxy sends a request to one of the other caching web proxies for a resource that the latter does not store in its cache memories.

Even if false positives consume bandwidth, the overall result is still a large decrease of bandwidth usage.

Publication U.S. Pat. No. 7,937,428 discloses a system and a method for generating and using a dynamic Bloom filter. In detail, several cascaded Bloom filters are used to represent a set of elements, wherein each time a new element is added in the set, it is also added to a current Bloom filter of the several Bloom filters. As a Bloom filter false-positive error rate grows with the number of elements it represent, a Bloom filter is considered full when the number of elements it represents reaches a predefined limit, which corresponds to its error rate reaching a corresponding limit. When the current Bloom filter is full, an additional Bloom filter is created and becomes the current Bloom filter for new elements to add to the set. Given that several Bloom filters then coexist, any request for an element involves checking the current Bloom filter and the previous Bloom filters.

The inventors wished to apply the above Bloom-filter-based sharing of cache information to the "Push" model of communication, in particular to the SPDY protocol.

On the Web, the usual paradigm is the "Pull" model whereby a client device, such as a web browser, requests a main digital resource, such as an HTML web page, from a web server device and receives the requested main resource in response.

The client device then parses the received HTML web page to discover which secondary resources referenced therein (e.g. images, scripts, etc.) are required for fully rendering the web page. It then requests them from the server device and upon receiving the requested secondary resources, it displays the entire web page.

However, new technologies, such as SPDY (standing for "SPeeDY") improving the well-known HTTP protocol (standing for "Hypertext Transfer Protocol") for sending web pages over the Internet, have emerged which also provide the above-mentioned "Push" model.

SPDY makes it possible for the server device to push resources to the client device, on its own initiative, over the same network connection as initiated by the original client request. This makes it possible for the server device to push the secondary resources referenced in the main resource requested by the client device, before the latter discovers they are needed.

Thanks to the SPDY push of resources, web pages can be loaded faster and their rendering be obtained faster.

Sharing cache information of the requesting client device is also an issue to avoid bandwidth waste, by enabling the server device to reduce the resources to push: the server will only push resources not yet in the client cache memories.

It is therefore wished to provide information about the client device's cache memories, using for example a Bloom-filter-based representation, to the server device.

For example, when requesting a main resource from a given web server device, the client device can search its cache memories for all the resources already received, in particular those received from that given web server.

The client device then creates a Bloom filter for representing those resources and sends the created Bloom filter array within the request to the web server device.

From the received Bloom filter array, the web server device is then aware of which resources are already available in the client device and which ones need to be sent to it, with a degree of certainty limited by the probability of false positive.

In the above example of a main requested resource and secondary resources referenced therein, the server device can determine which secondary resources are not yet available in the client device using the Bloom filter array and decide to send those not yet available resources to the client device.

To give an exhaustive explanation, a false positive means that the server device will not push a resource (such as a secondary resource) the client device does not have in its cache memories.

This transposition of the Bloom-filter-based sharing of cache information to SPDY to optimize push of secondary resources does not appear fully satisfactory.

In particular, initial experiments have shown that the naïve implementation of the Bloom-filter-based sharing is only partially successful. While Bloom filters provide a compact representation of the client device's cache memories, the experimental false positive rates are much higher than expected. This is probably due to the small number of resources that are processed. Indeed, the approximations given above for computing the probability of false positive are liable to be no longer valid for small numbers.

In addition, the false-positive rate is the same for all the resources, in particular independent of the importance of each resource. Consequently, not sending a needed secondary resource of high importance (even of critical importance) for rendering the main resource statistically happens as often as not sending a needed secondary resource of normal importance for rendering the main resource. This is clearly not satisfactory, and how to reduce the false-positive rate for important resources should be sought, for example to improve the web page downloading time, or at least the user's perceived downloading time.

The present invention has been designed to overcome at least one of the above drawbacks, in particular to provide more efficient cache information, i.e. a more efficient data structure representing the availability of resources at a communication device.

A straightforward possibility is to increase the precision m of the Bloom filter. This is possible in some cases, when the size of the client device's cache memories is sufficiently small. But in other cases, this would make the client request prohibitively large since the increase of the accuracy would also apply to resources of normal importance, with very little benefit.

The present invention has been devised to address at least one of the foregoing concerns, in particular to provide an augmented data structure representing the availability of resources at a communication device with reasonable and controlled increase of size.

The present invention may apply to the Push model of SPDY but also to any case where cache information representing the availability of resources in cache is generated.

SUMMARY OF THE INVENTION

In this context, according to a first aspect of the invention, there is provided a method of generating and using an augmented data structure representing the availability of resources in a communication device, the method comprising:

providing a first group of resources available in the communication device and one or more additional groups of other resources available in the same communication device, providing one or more hash functions for each of the first and additional groups of resources, and calculating one or more hash values for each resource using the one or more corresponding hash functions, mapping each obtained hash value onto one entry of a data structure, wherein the hash values obtained from a resource of the first group are mapped onto a first subpart of the data structure only and the hash values obtained from a resource of an additional group are mapped onto a portion of the data structure including the first subpart and an additional subpart.

Correspondingly, according to a second aspect of the invention, there is provided a system for generating and using an augmented data structure representing the availability of resources in a communication device, the system comprising:

a resource grouping module for providing a first group of resources available in the communication device and one or more additional groups of other resources available in the same communication device, a hash module for providing one or more hash functions for each of the first and additional groups of resources, and for calculating one or more hash values for each resource using the one or more corresponding hash functions, a mapping module for mapping each obtained hash value onto one entry of a data structure, wherein the hash values obtained from a resource of the first group are mapped onto a first subpart of the data structure only and the hash values obtained from a resource of an additional group are mapped onto a portion of the data structure including the first subpart and an additional subpart.

Generally, the system is implemented in the communication device.

According to a third aspect of the invention, there is provided a non-transitory computer-readable medium storing a program which, when executed by a microprocessor or computer system in the communication device, causes the communication device to perform the steps of:

providing a first group of resources available in the communication device and one or more additional groups of other resources available in the same communication device, providing one or more hash functions for each of the first and additional groups of resources, and calculating one or more hash values for each resource using the one or more corresponding hash functions, mapping each obtained hash value onto one entry of a data structure, wherein the hash values obtained from a resource of the first group are mapped onto a first subpart of the data structure only and the hash values obtained from a resource of an additional group are mapped onto a portion of the data structure including the first subpart and an additional subpart.

As shown below, a data structure of the invention, e.g. a Bloom filter, is said to be "augmented" because it comprises an extension of a conventional data structure (e.g. conventional Bloom filter) in order to provide a complementary portion for representing one or more specific sets of resources, namely the above-referenced "additional groups".

The augmented data structure according to the present invention improves the efficiency of data structures disclosed in the prior art, by enabling a variable false-positive rate to be provided depending on the resources, e.g. importance of the resource.

In particular, this is achieved by extending a subpart of the data structure common to two groups of resources, namely the first mapped subpart, with an additional subpart to provide additional accuracy when representing the resources of an additional group of resources.

As a consequence, the increase of accuracy for only the resources of the additional group provides a lower false-positive rate for those resources compared to the false-positive rate implemented for the resources of the first group. This means that some kinds of resources can be given priority as regards reducing false positive compared to other resources.

In an illustrative application, the invention makes it possible to modify Bloom filters in order to have a variable false-positive rate depending for example on the importance of the resource when rendering it. This generally results in a higher-quality rendering of a main resource since there is less chance of a needed important secondary resource being erroneously not sent, compared to the prior art not implementing the invention.

The subpart additional to the common first subpart implements the extension within the data structure as described below.

Referring to the SPDY example as described above, a fourth aspect of the invention from the server device's perspective relates to a method of sending digital resources in a client-server communication system, comprising, at a server device, obtaining an augmented data structure representing the availability of resources in a communication device, the augmented data structure being generated according to the method of generating as defined above, determining whether a given resource is available in the communication device using the obtained augmented data structure, to take action or not to send the given resource to the communication device or to request the given resource from the communication device.

Correspondingly, according to a fifth aspect of the invention, there is provided a server device for sending digital resources to a client device in a client-server communication system, comprising, a communication module for obtaining an augmented data structure representing the availability of resources in a communication device, the augmented data structure being generated according to the method of generating as defined above, an availability check module for determining whether a given resource is available in the communication device using the obtained augmented data structure, to decide or not whether to take action to send the given resource to the communication device or to request the given resource from the communication device.

Other features of embodiments of the invention are further defined in the dependent appended claims. While these features are mostly described with reference to methods of the invention, similar features are provided for a corresponding system and a corresponding server device.

According to a first embodiment of the invention, the one or more hash functions associated with an additional group of resources includes the one or more hash functions associated with the first group of resources and one or more additional hash functions. The additional hash functions provide a higher degree of accuracy when checking whether a resource is in the additional group. The risk of a false positive is thus reduced.

In particular, the one or more hash values obtained using the one or more hash functions common to the first and additional groups are mapped onto the first subpart of the data structure, and the one or more hash values obtained using the one or more additional hash functions are mapped onto the additional subpart of the data structure. The data structure according to the invention thus provides a core first subpart, generally a conventional Bloom filter, and an additional subpart extending the first subpart to provide the higher degree of accuracy only for the resources of the additional group. This is why different false-positive rates are obtained for two different groups of resources. Giving precedence to one kind of resources over another kind is thus rendered possible.

In a variant of the first embodiment of the invention, the one or more hash functions provided for the first group have values in a first range of values, and the one or more hash functions provided for an additional group have values in a range of values that includes and extends the first range, i.e. a wider range. The additional possible hash values (i.e. the values extending the first range) provide the increase of accuracy when checking the availability of resources of the additional group.

In particular, the first subpart of the data structure is arranged to map hash values belonging to the first range and the additional subpart of the data structure is arranged to map hash values extending beyond the first range. Again the additional subpart is only used by the resources of the additional group. This ensures the availability check for resources of the additional group can be performed with a higher degree of accuracy.

Two situations may occur in this variant of the first embodiment. Firstly, the one or more hash functions provided for an additional group comprise only the one or more hash functions provided for the first group but with values in an extended range of values. Secondly and alternatively, the one or more hash functions provided for an additional group comprise the one or more hash functions provided for the first group but with values in an extended range of values and comprise hash functions additional to the one or more hash functions provided for the first group. By providing additional hash functions, the second situation provides a higher degree of accuracy when checking availability of resources of the additional group.

According to one embodiment of the invention, the data structure is a set of Boolean values, and the mapping of a hash value onto the data structure comprises setting to 'true' the Boolean value of index equal to the hash value. Only one bit (Boolean value) is required to store the information about a hash value. Therefore the data structure is of small size.

In particular, the method may further comprise determining whether a resource is available in the communication device using the data structure, wherein the resource is determined as available only if all the Boolean values indexed by the one or more hash values obtained from the resource are 'true'. Efficient availability checking is thus obtained.

According to a particular feature, the first subpart of the data structure is a Bloom filter and the additional subpart extends the Bloom filter for the resources of the additional group only. Bloom filters prove to be well adapted to availability checking as discussed above.

According to another embodiment of the invention, the method comprises obtaining a set of resources stored in memories of the communication device and filtering the obtained set according to at least one filtering criterion to reduce the set to a subset of relevant resources. These steps take place during the process of making an inventory of the resources available in the communication device. The above provision seeks to optimise the size (and so the efficiency) of the augmented data structure according to the invention. This is because, thanks to the filtering before calculating the hash values and performing the mapping, the number of resources to be represented by the augmented data structure can be drastically reduced, depending on the filtering criteria used.

According to a particular feature, the at least one filtering criterion comprises the origin of the resource. This makes it possible for example to select only the cached resources that were supplied by the same server device, in case a new request is made from that server device. This aims at minimizing the size of the augmented data structure according to the invention.

According to another particular feature, the at least one filtering criterion comprises a cache validity associated with each resource of the set. This makes it possible to discard resources that are liable to be out-of-date. This is because cache validity is known as defining a theoretical lifespan of the associated resource.

In particular, the cache validity associated with a resource is updated based on a time between two successive downloads of different versions of that resource and optionally on (an uncertainty measure defined by) a time between a last version check followed by a subsequent download and the subsequent download. This results in the cache validity being more relevant to the current situation of the system.

According to yet another particular feature, the at least one filtering criterion comprises the size of the data structure (first subpart and additional subparts) as a function of one or more conditions applying to the resources of the set. This is to avoid data structures (such as Bloom filters) of large size being generated.

In particular, the one or more conditions are selected from the set comprising: cache validity associated with each resource; a size of each resource; a type of each resource; and link information representing relationships between the resource and other resources (for example resources already requested by the communication device).

According to yet another particular feature, the method further comprises:

splitting the subset of relevant resources into the first and additional groups of resources based on one or more criteria concerning the resources, providing a target false positive rate for each group, defining the first subpart of the data structure as a Bloom filter and one or more additional subparts as extensions of the Bloom filter based on respective numbers of resources per group and the respective target false positive rates.

As described below, improved theoretical design of each first and additional subpart can be implemented and obtained.

According to yet another embodiment of the invention, resources available in the communication device are split into the first and additional groups of resources based on one or more criteria concerning the resources selected from the set comprising:

a size of each resource, the impact of each resource in the rendering of a main resource, wherein the resources are secondary resources referenced within one or more main resources requested by the communication device, including the appearance of the rendering or the functionalities during the rendering as perceived by a user, and the time at which the communication device needs to process each resource.

These criteria are some amongst many possible criteria representing the relative importance of some resources compared to other resources. By using such criteria, the invention makes it possible to provide better false-positive rates for important resources.

A basic approach is to separate less important resources from important resources, thus resulting in a first group of less important resources and a single additional group of important resources.

However, the invention may provide that several additional groups are produced to distinguish between several levels of resource importance.

The additional groups may be independently mapped onto respective isolated subparts of the data structure, meaning that the extensions of the hash values in common with the first group are independent from one additional group to the other.

In a variant, the additional groups may be hierarchically dependent, meaning that an additional group further extends the hash functions of the additional group corresponding to the level of resource importance just below. Regarding the subparts of the data structure, this means that the hash values for a resource of an additional group are mapped onto the first subpart and all the additional subparts assigned to the additional groups of lower importance level.

According to yet another embodiment of the invention, the method further comprises including data structure information in a request message requesting a main resource from a server device. This makes it possible for the server device to be quickly aware that a data structure according to the invention (i.e. with a variable false-positive rate for availability check) exists for checking availability of resources in the requesting communication device. This is helpful for the server device to optimise the number of resources, generally secondary resources as defined above, to push to the requesting communication device.

In particular, the data structure information in the request for the main resource includes the first subpart and the one or more additional subparts. Thanks to this provision, the server device is quickly aware of the resources available at the requesting communication device.

In a variant, the data structure information including the first subpart and the one or more additional subparts is split into chunks and sent in the request message and subsequent messages. This makes it possible to lighten the initial request for the main resource so that it is quickly processed by the server device.

According to a particular feature, the data structure information is inserted into a header of the message. This may be an HTTP header for example.

According to another particular feature, the data structure information comprises an optional importance criterion to discriminate between resources of the first and one or more additional groups; for each of the first and one or more additional groups, the number of resources that it comprises and the size of the corresponding first or additional subpart; an optional definition of the one or more hash functions; an optional type of extension defining the one or more hash functions provided for an additional group compared to the one or more hash functions provided for the first group; and the data structure including the first and one or more subparts. The above optional information may be discarded when it is predefined (e.g. by default) and thus known in advance by the communication device and the server device. The data structure information as exhaustively defined above makes it possible for the server device to fully recover all the information required to perform an efficient availability check.

In particular, the method may comprise beforehand determining whether or not to include the data structure information in the request message based on one or more criteria selected from the set comprising: the inclusion in the requested main resource of references to one or more secondary resources; and history information specifying that data structure information has already been sent to the server device; and the nature of the request message. This provision is to avoid unnecessary sending of the augmented data structure according to the invention. This may be because the requested server device already has a recent version of that data structure. It may also be because, given the request, the data structure will not be used by the server device. Also, some requests of the HEAD or PUT type do not need a Bloom filter to be included therein. Similarly, requests dealing with image, video or JSON document (and generally any resource that cannot embed reference to another resource) do not require a Bloom filter for the server device. As a consequence, the provision saves network bandwidth consumption.

According to yet another embodiment of the invention, the one or more hash functions are different combinations of the same two (or more) base hash functions available in the communication device along with the first and additional groups of resources. In particular, the values of the two base hash functions for a given resource are stored in cache memory of the communication device once computed so to enable the communication device to derive the hash functions for the given resource from these two stored values. This provision reduces computational complexity. This is because computing a hash value normally requires at least reading the whole resource to hash and performing high complexity operations on the resource. In the above case, once the two base hash functions have been computed for a given resource, the one or more hash functions only rely on operations with low complexity such as additions and multiplications. This then avoids reading again the whole resource and performing again the high complexity operations on the resource.

According to a particular feature, the one or more hash functions compute hash values for a resource from input that comprises a key identifying the resource.

This makes it possible to distinguish the same content that can be stored by two different communication devices. Indeed, in that case, there are two different resources although they have the same content.

In particular, the input for the hash functions comprises the content of the resource and a Uniform Resource Locator identifying the resource.

The above method of sending digital resources in a client-server communication system may also be implemented through various embodiments.

According to a particular feature, the method may further comprise, still at the server device, receiving a request for a main resource from the communication device (which is then a client device), wherein the given resource is a secondary resource associated with the requested main resource, and the server device pushes the secondary resource to the communication device in case of negative determination of whether the given resource is available in the communication device. This provision is particularly suitable for SPDY.

According to another particular feature, the method may further comprise, still at the server device, receiving a request for a main resource from a client device, requesting the given resource from the communication device in case of positive determination and pushing the given resource obtained from the communication device to the requesting client device, wherein the given resource is a secondary resource associated with the requested main resource, and the communication device is a caching server device.

Of course, the two above particular features can be combined, meaning that two augmented data structures according to the invention are provided to the server device, one from the requesting client device and one from the caching server device. In that case, when a secondary resource is needed for the requested main resource but not hosted by the server device, the latter can first determine whether the secondary resource is already available in the requesting client device using the first augmented data structure, and if it is not determining whether one caching server device has the secondary resource using the second augmented data structure. Then the server device requests the appropriate caching server device and serves the retrieved secondary resource to the requesting client device.

According to a sixth aspect of the invention, there is provided a method of generating an augmented data structure representing the availability of resources in a communication device, the method comprising:

providing a first group of resources available in the communication device and one or more additional groups of other resources available in the same communication device, providing one or more hash functions for each of the first and additional groups of resources, and calculating one or more hash values for each resource using the one or more corresponding hash functions, wherein the one or more hash functions provided for an additional group are extended hash functions compared to the hash functions provided for the first group, grouping together the one or more hash values obtained for the resources of an additional group that extend the possible hash values obtained using the non-extended hash functions provided for the first group, and grouping together the other hash values obtained for the resources of the additional group and the hash values obtained for the resources of the first group.

Both approaches previously disclosed can be applied. In this context, the extension may rely on having additional hash functions for the additional group compared to the first group. In a variant, the extension may rely on hash functions associated with the additional group that have values in a wider ranger than the hash functions associated with the first group.

In the first case, the first grouping groups the hash values obtained using the one or more additional hash functions (only for the additional group) while the second grouping groups the hash values obtained for the resources of both the first and additional group using the one or more hash functions in common for the two groups of resources.

In the second case, the first grouping groups the hash values that overflow the first range (only for the additional group) while the second grouping groups the hash values belonging to the first range.

This sixth aspect of the invention can also implement the particular features discussed above.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects which may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium, for example a tangible carrier medium or a transient carrier medium. A tangible carrier medium may comprise a storage medium such as a floppy disk, a CD-ROM, a hard disk drive, a magnetic tape device or a solid state memory device or the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 7 is a plot comparing the false-positive rate using conventional Bloom filters and augmented Bloom filters according to the invention, as a function of the size of handled resources;

FIG. 8 is a similar plot comparing the false-positive rate weighted by the size of each resource, using conventional Bloom filters and augmented Bloom filters according to the invention;

DETAILED DESCRIPTION OF EMBODIMENTS OF THE INVENTION

The invention provides methods, systems and devices for generating and using an augmented data structure representing the availability of resources in a communication device, in particular an augmented Bloom filter compared to conventional Bloom filters. The augmentation according to the invention is provided by an additional portion of the data structure that supplements it in order to better represent the availability of some of the resources, e.g. more important resources.

The invention also provides methods and server devices for sending digital resources in a client-server communication system, based on such augmented data structure.

Figure 1:
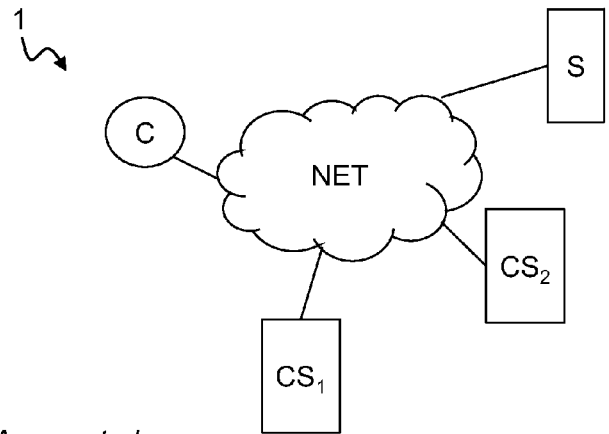
FIG. 1 illustrates a typical web client-server communication system in which embodiments of the invention may be implemented.

A typical web client-server communication system 1 is shown in FIG. 1, in which embodiments of the invention may be implemented.

It comprises a communication network NET such as an IP-based local or wide area network (LAN, WAN), a web server device S that offers IP-based services, such as web sites, caching web server devices CSi and a client device C.

Each server devices S,CSi hosts digital resources in internal storage memories and can provide them to any requesting party.

In the typical system 1, the client device C implements a web browser through which a user interacts to generate and send HTTP requests to the web server device S in order to request main resources, e.g. web pages.

Similarly, the web server device S may request any of the caching web server devices CSi for a resource that it does not host but has to serve to the client device C.

To optimise the exchange of messages between on the one hand C and S and on the other hand S and CSi, the devices can share cache information such as Bloom filters as briefly introduced above.

The present invention more specifically regards an augmented Bloom filter having a variable false-positive rate making it possible to give priority to some kinds of resources.

The description below will make reference to a SPDY-based example, where the server device receives a request for a main resource from the client device; determines whether a secondary resource referenced within the main resource (e.g. an image in a requested web page) is available in the client device using the augmented data structure (augmented Bloom filter) obtained from the client device; and pushes the secondary resource to the client device in case of negative determination.

Other situations may be implemented within the scope of the invention, for example when the server device S requests a caching server device CSi for a resource that S does not host yet but has to serve to C. To link that case to the preceding example, the server device S receives a request for a main resource from a client device C; determines whether a secondary resource referenced within the main resource (e.g. an image in a requested web page) is available in the caching server device CSi using the augmented data structure (augmented Bloom filter) obtained from the caching server device; requests the secondary resource from the caching server device CSi in case of positive determination; and pushes the secondary resource obtained from the caching server device to the requesting client device C. The server device S could also proceed in a similar way to retrieve the requested main resources from the caching server device.

Figure 2:
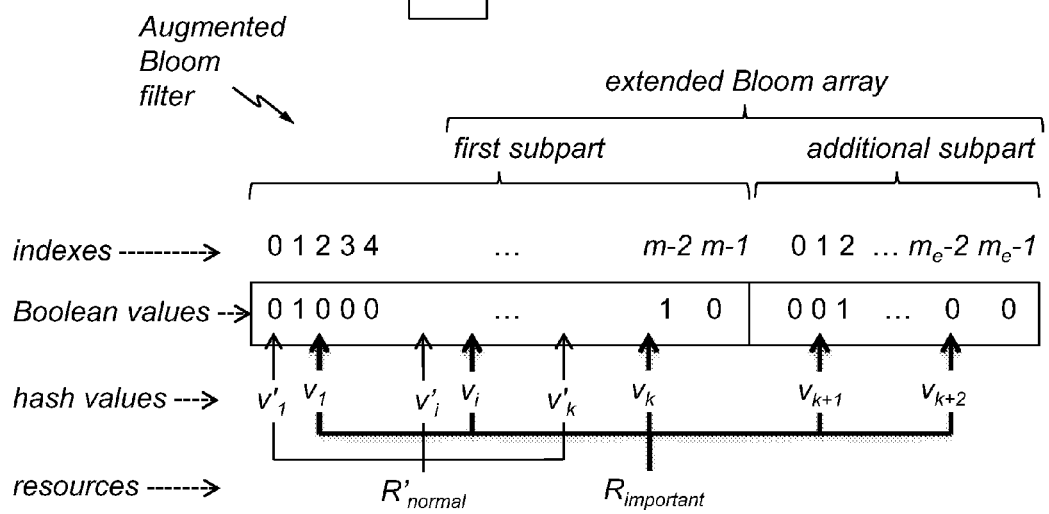
FIG. 2 illustrates an augmented Bloom filter according to a first embodiment of the invention.
Figure 3:
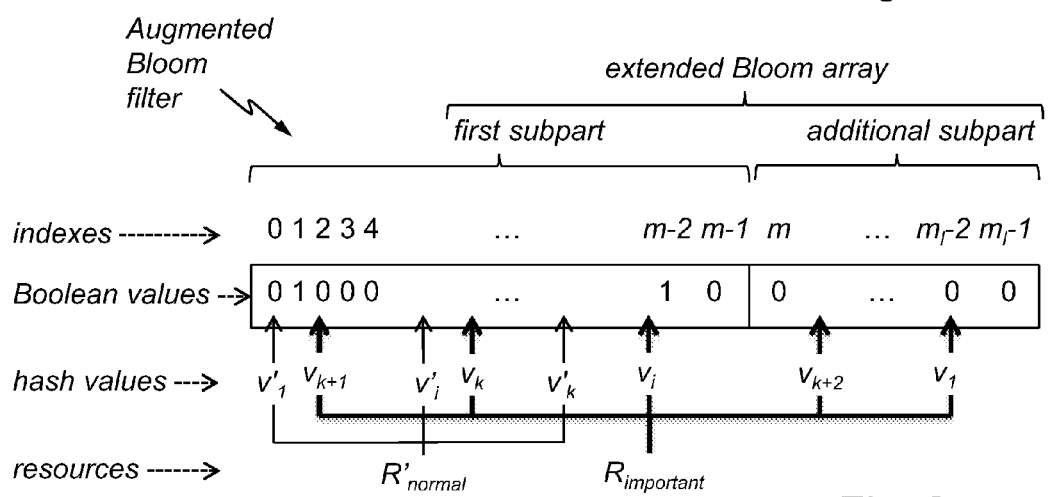
FIG. 3 illustrates an augmented Bloom filter according to a second embodiment of the invention.

FIGS. 2 and 3 illustrate an augmented Bloom filter according to two embodiments of the invention.

Implementation of the Bloom array as depicted in those Figures is not mandatory in the invention. As briefly introduced above and as further described below, a method according to an embodiment of the invention comprises providing a first group or list of resources available in the communication device, (let it be the client device in the above SPDY-based example) and one or more additional groups of other resources available in the same communication device. This may be a first group of normal importance resources for which a medium false-positive rate is satisfactory, and additional groups of high importance resources for which a more efficient false-positive rate (i.e. a lower rate) is sought. Criteria to define the importance of the resources, in particular to sort the resources into the several first and additional groups, are described below with more details.

The method also comprises providing one or more hash functions for each of the first and additional groups of resources, and calculating one or more hash values for each resource using the one or more corresponding hash functions. Hash functions, in particular in the context of Bloom filters, are well-known by one skilled in the art and consequently are not further detailed herewith.

The one or more hash functions provided for an additional group may in particular be extended hash functions compared to the hash functions provided for the first group. This extension intends to provide more accuracy when checking availability of the resources of the additional group (of higher importance). Thanks to the extension, a lower false-positive rate can be achieved.

The method yet further comprises grouping together the one or more hash values obtained for the resources of an additional group that extend the possible hash values obtained using the non-extended hash functions provided for the first group, and grouping together the other hash values obtained for the resources of the additional group and the hash values obtained for the resources of the first group.

The two groups of hash values may then be shared with the other devices of the system 1 as cache information. Indeed, based on the group of hash values common to all the resources, availability of a normal importance resource in the client device can be checked. Thanks to the other group of hash values (specific to the additional group of higher importance resources), a complementary check can be performed for important resources of each group thus providing an increased accuracy in the check and thus a lower false-positive rate.

Instead of directly sending the hash values by groups as described, preference is given to the mapping of these hash values onto a binary data structure, for example an extended Bloom array.

This is illustrated in FIGS. 2 and 3.

The method of the invention according to these embodiments comprises mapping each obtained hash value onto one entry of a data structure, wherein the hash values obtained from a resource of the first group (of lower importance) are mapped onto a first subpart of the data structure only and the hash values obtained from a resource of an additional group (of higher importance) are mapped onto a portion of the data structure including the first subpart and an additional subpart.

Since the data structure can be a Bloom filter of Boolean values, the mapping of a hash value onto the data structure may consist practically in setting to 'true' the Boolean value of index equal to the hash value. Thus, the first subpart of the data structure is a conventional Bloom filter initially designed to represent the normal resources and the additional subpart extends the Bloom filter for the resources of the additional group only.

Based on the Boolean-based approach, when determining whether a resource is available in the client device using the data structure, the resource is determined as available only if all the Boolean values indexed by the one or more hash values obtained from the resource are 'true'. This is applicable for both the normal resources which will only refer to the first subpart for the Boolean check, and the important resources which will possibly refer to the additional subpart for the Boolean check.

FIG. 2 illustrates an extension of Bloom filters that handles two kinds of resources (normal importance and high importance resources) in different ways to provide variable false-positive rate. Among the n resources, let $n_e$ be the number of important resources.

In this first embodiment, the one or more hash functions associated with an additional group of resources includes the one or more hash functions associated with the first group of resources and one or more additional hash functions. This means that there are hash functions common to the two (or more) groups of resources.

In addition, the one or more hash values obtained using the one or more hash functions common to the first and additional groups are mapped onto the first subpart of the data structure, and the one or more hash values obtained using the one or more additional hash functions are mapped onto the additional subpart of the data structure.

A conventional Bloom filter is used to represent the normal importance resources: each resource is represented in a Bloom array of m Boolean values (the first subpart of the extended Bloom array) using the hash values $v_i$ computed using the k hash functions of the Bloom filter. Each hash function has value in the range [0, m−1].

However, for important resources an extended representation is used. The extension is provided by the additional hash functions k+1 and k+2. While FIG. 2 only shows two additional hash values $v_{k+1}$ and $v_{k+2}$, any number $k_e$ of additional hash functions can be used ($k_e \geq 1$).

The base representation for an important resource (i.e. the hash values $v_1$ to $v_k$) is stored in the array (first subpart) of m Boolean values using the hash values computed using the k hash functions in common.

The hash values $v_{k+1}$ and $v_{k+2}$ (more generally $v_{k+1}$ to $v_{k+ke}$) extending the base representation of the important resources are stored in an additional array of Boolean values: the additional subpart of the extended Bloom array as shown in the Figure. This additional array thus extends the conventional Bloom array.

The size $m_e$ of the additional subpart is the range to which the hash values resulting from the additional hash functions belong. $m_e$ may be equal to m. But preferably, to avoid a large additional subpart $m_e$ is chosen smaller than m, depending on whether there are a large number $n_e$ of important resources.

The conventional false-positive probability p for the normal resources is $$p \approx (1-e^{-kn/m})^k$$

The false-positive probability $p_e$ for the important resources is $$p_e \approx (1-e^{-kn/m})^k (1-e^{-k_e n_e/m_e})^{k_e}$$

This means that the optimal numbers k of common hash functions in and $k_e$ of additional hash functions are:

$$k = \frac{m}{n}\ln 2$$
$$k_e = \frac{m_e}{n_e}\ln 2$$

From these optimal values, the false-positive probabilities can be computed.

FIG. 3 illustrates another extension of Bloom filters that handles two kinds of resources (normal importance and high importance resources) in different ways to provide a variable false-positive rate. Among the n resources, let $n_e$ be the number of important resources and $n_s$ be the number of normal resources.

In this second embodiment, the one or more hash functions provided for the first group have values in a first range [0, m−1] of values, and the one or more hash functions provided for an additional group have values in a range [0, $m_l$−1] of values that includes and extends the first range, i.e. a wider range ($m_l > m$). In that case, the first subpart of the data structure is arranged to map hash values belonging to the first range and the additional subpart of the data structure is arranged to map hash values extending beyond the first range.

A conventional Bloom filter is used to represent the normal importance resources: each resource is represented in a Bloom array of m Boolean values (the first subpart of the extended Bloom array) using the hash values $v_i$ computed using the k hash functions of the Bloom filter. Each hash function has value in the range [0, m−1].

However, for important resources the hash functions are extended by extending the range in which they take values to [0, $m_l$−1] where $m_l > m$. This may be done by modifying a "modulo m" operation into a "modulo $m_l$" operation.

For example, the one or more hash functions provided for an additional group comprise only the one or more hash functions provided for the first group (and no more than those) but with values in an extended range of values.

In a variant where additional hash functions are also provided for the additional groups, the one or more hash functions provided for an additional group comprise the one or more hash functions provided for the first group but with values in an extended range of values and comprise hash functions additional to the one or more hash functions provided for the first group.

FIG. 3 is based on this variant since the additional hash functions k+1 and k+2 are shown (through the hash values $v_{k+1}$ and $v_{k+2}$). But one may note that $v_1$ is mapped onto the additional subpart and no longer onto the first subpart. This is because for the important resources the hash functions have values in [0, $m_l$−1].

The k hash functions are therefore common to the first and additional groups of resources.

Let $k_v$ ($k_v \geq k$) be the number of hash functions provided for the group of important resources. $k_v = k$ in the first case and $k_v = k + k_e$ in the variant shown in FIG. 3 ($k_e = 2$), where $k_e$ is the number of additional hash functions for the additional group.

The hash values belonging to the extended range [0, $m_l$−1] for the important resources are stored in the extended Bloom array including the first subpart [0, m−1] and an additional subpart [m, $m_l$−1]. FIG. 3 shows clearly that the additional subpart [m, $m_l$−1] of the data structure is reserved only for the important resources ($m_e = m_l − m$ represent the number of additional bits required for the important resources). This is because $v_i$ for a normal resource cannot extend beyond m−1.

The false-positive probability p for normal resources is $$p \approx (1-e^{-kn_s/m_e - k_v n_e/m_l})^k$$

The false-positive probability $p_v$ for the important resources is $$p_v \approx \left(1 - e^{-\frac{kn_s}{m}} e^{-\frac{k_v n_e}{m_l}} \frac{m}{m_l} - e^{-\frac{k_v n_e}{m_l}} \frac{m_l - m}{m_l}\right)^{k_v}$$

The optimal values for k and $k_v$ can be determined experimentally.

From these optimal values, the false-positive probabilities can then be computed.

One may note that the number m of bits used by a Bloom filter directly impacts on the false-positive rate resulting from this Bloom filter usage. Therefore, this number of bits can be defined beforehand to always have the same desired precision. Similarly, the number $m_e$ of additional bits for important resources can be defined depending on the target precision for these resources.

In a variant, the precision could be predefined with predefined values and then adapted depending on the number of resources to handle in each group.

Figure 4:
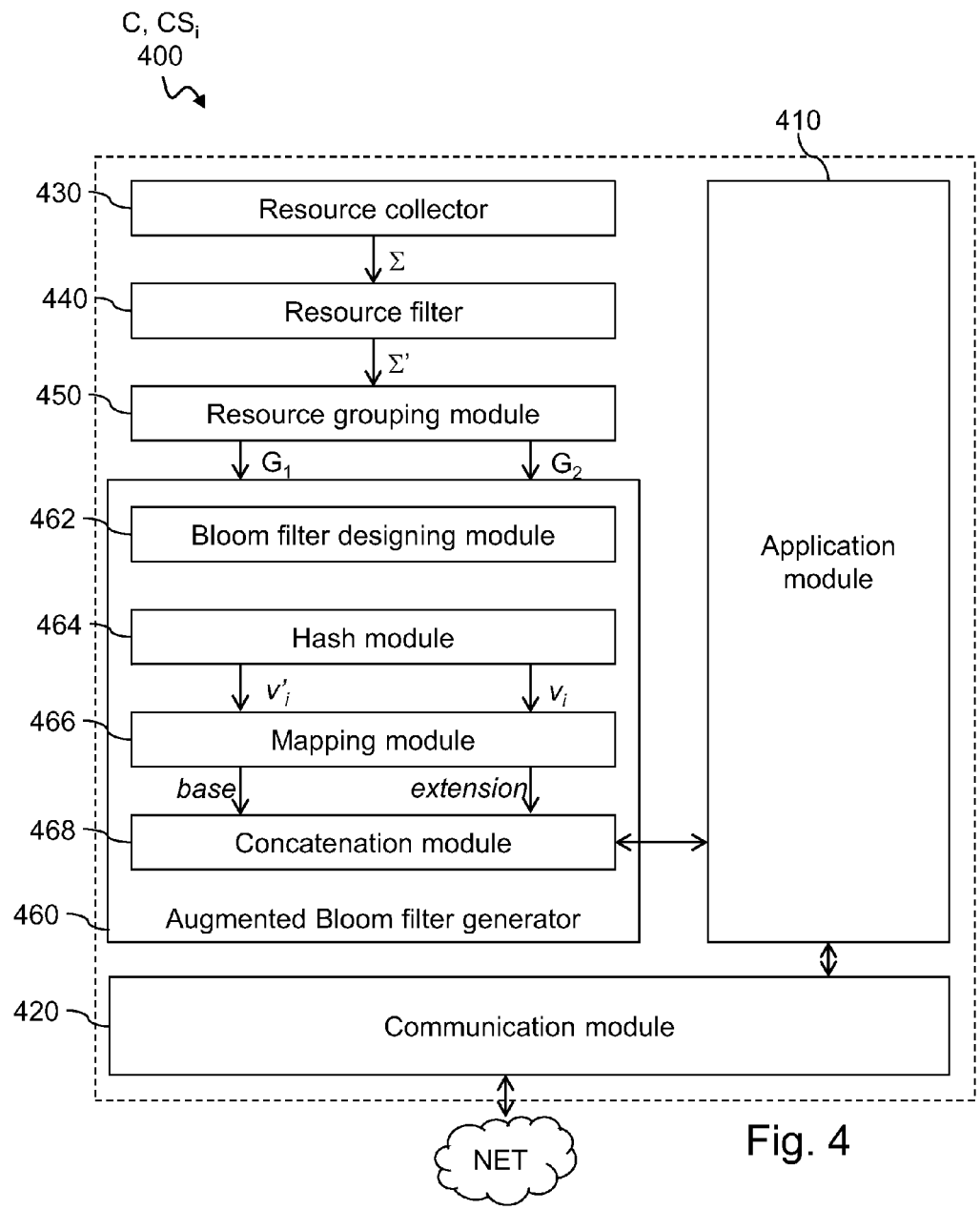
FIG. 4 is a block diagram illustrating functional components of the client device or a caching server device of FIG. 1 in which embodiments of the invention may be implemented.
Figure 5:
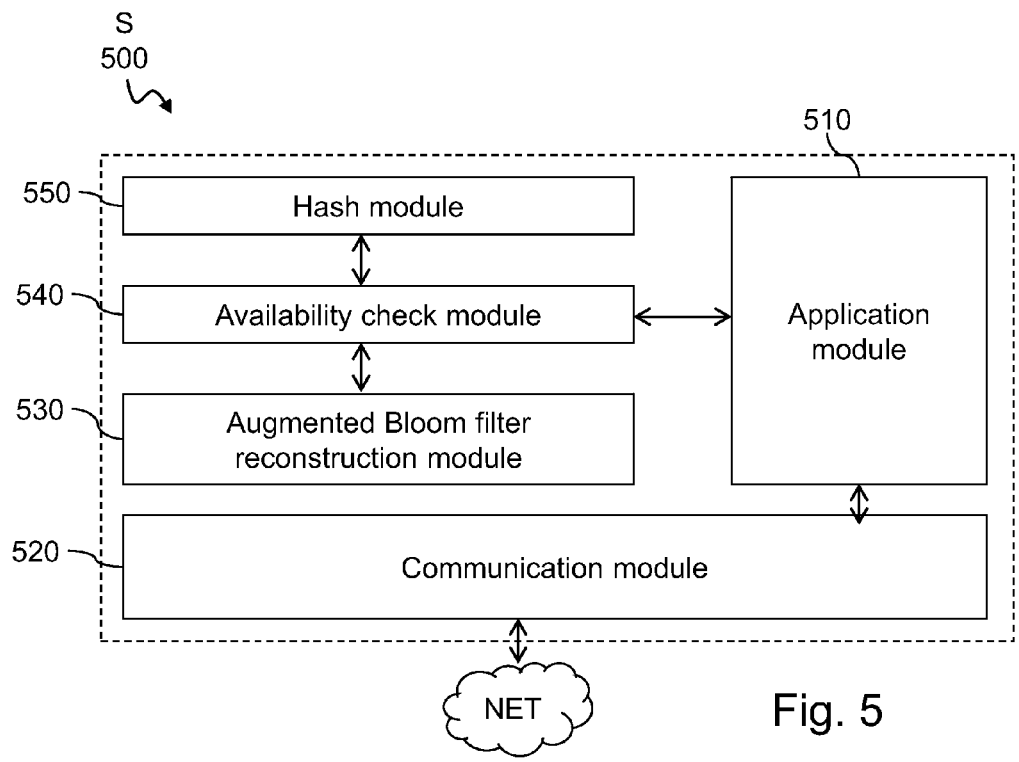
FIG. 5 is a block diagram illustrating functional components of the server device of FIG. 1 in which embodiments of the invention may be implemented.

FIGS. 4 and 5 show functional blocks of a client device C or a caching server device CS depending on which one is concerned by the provision of data structure information corresponding to cache information to the server device S (FIG. 4) and of the server device S (FIG. 5).

Conventionally, the communication device 400 of FIG. 4 comprises an application module 410 designed to handle requests and responses with S, for example according to the HTTP protocol, and a communication module 420 interfaced with the network NET to send or receive the requests/responses to/from S.

Implementation of the invention provides the communication device 400 with a resource collector 430 to obtain a set $\Sigma$ of resources stored in memories of the communication device; a resource filter 440 to filter the obtained set according to at least one filtering criterion to reduce the set to a subset $\Sigma'$ of relevant resources. This is described below with reference to FIG. 10.

The communication device 400 also comprises to produce the augmented Bloom filter, a resource grouping module 450 to split the subset $\Sigma'$ of relevant resources into the first and additional groups ($G_1$, $G_2$) of resources based on one or more criteria concerning the resources. Examples of criteria are provided below. The resource grouping module 450 thus provides a first group $G_1$ of resources available in the communication device (the normal resources) and one or more additional groups $G_2$ of other resources available in the same communication device (the important resources, possibly organised according to several importance levels).

The communication device 400 also comprises an augmented Bloom filter generator 460.

The augmented Bloom filter generator 460 receives as input the groups $G_1$, $G_2$ of resources and other parameters described below and generates an augmented Bloom filter as defined by the invention, for example any of the two augmented Bloom filters shown in FIGS. 2 and 3, depending on the type of Bloom filter extension selected.

The augmented Bloom filter generator 460 comprises a Bloom filter designing module 462, a hash module 464, a mapping module 466 and a concatenation module 468.

The Bloom filter designing module 462 is configured to determine the characteristics of the augmented Bloom filter according to the invention. In particular it should be able to define the first subpart of the data structure as a Bloom filter and one or more additional subparts as extensions of the Bloom filter based on respective numbers of resources per group and respective target false positive rates.

In this context, it first determines the main characteristics of the Bloom filter to be used to represent the group of normal resources, namely the value k given known values m, n or the values k and m given the known values n and p. For the latter, that means that a target false positive rate has been provided for each group of resources.

Then, the Bloom filter designing module 462 determines the characteristics of the extension of the Bloom filter to represent an additional group of resources (this should be done for each of the additional groups). Depending on the type of Bloom filter extension (FIG. 2 or 3), $k_e$, $k_v$, $m_e$ and/or $m_l$ are computed from known values such as k, m, n, $n_s$, p, $n_e$, $p_e$ and/or $p_v$.

The hash module 464 is designed to provide one or more hash functions for each of the first and additional groups $G_1$, $G_2$ of resources, and for calculating one or more hash values ($v_i$, $v'_i$; on FIGS. 2 and 3) for each resource using the one or more corresponding hash functions. The number k and $k_e$ or $k_v$ of hash functions and the sizes m and $m_e$ or $m_l$ have been determined by module 462. Predefined hash functions may be known from the communication device 400 and the server device S from these numbers.

To reduce complexity of this module when the communication device 400 is configured to generate a large number of hash values $v_i$, the one or more hash functions may be different combinations of the same base hash functions (at least two), for example of two base hash functions.

For example, each of the k (or $k_v$) hash functions used by the augmented Bloom filter is computed as a linear combination of these two base hash functions. If the two base functions are $h_1(x)$ and $h_2(x)$, then the i-th hash function $g_i$ for the Bloom filter may be defined as:

$$g_i(x) = h_1(x) + i h_2(x)$$

Using such a definition for the hash functions does not change the characteristics of the Bloom filter and has no impact on the Bloom filter performance.

The mapping module 466 receives as input the hash values $v_i$, $v'_i$ calculated by the hash module 464 and is configured for mapping each obtained hash value onto one Boolean value of the first subpart of the extended Bloom array or of the additional subpart, depending on its value or on whether it is related to an important resource or not. In particular, the hash values obtained from a resource of the first group (normal resources) are mapped onto a first subpart (conventional Bloom array) of the data structure only and the hash values obtained from a resource of an additional group (important resources) are mapped onto a portion of the data structure including the first subpart and an additional subpart (extension of the Bloom array).

Once the mapping module 466 has mapped all the hash values onto the conventional Bloom array and/or onto the extension of the Bloom array, the concatenation module 468 concatenates the two (or more) subparts to produce the extended Bloom array as shown in FIG. 2 or 3.

The obtained augmented Bloom filter is then sent to the application module 410 for processing, in particular for sending to the server device S as described below.

The server device 500 of FIG. 5 comprises, similarly to FIG. 4, an application module 510 designed to handle requests and responses with the communication device 400, for example according to the HTTP protocol, and a communication module 520 interfaced with the network NET to send or receive the requests/responses to/from C or $CS_i$.

In particular, the communication module 520 of the server device S obtains augmented data structures according to the invention representing the availability of resources in one or more communication devices.

Implementation of the invention provides the server device 500 with an augmented Bloom filter reconstruction module 530, an availability check module 540 and a hash module 550 similar to module 464.

The augmented Bloom filter reconstruction module 530 is configured to parse data from the bitstream received from C or CS, to retrieve the sent extended Bloom array as well as other parameters defining the augmented Bloom filter.

Such parameters, some of which may be optional, are described below and may comprise: an optional importance criterion to discriminate between resources of the first and one or more additional groups; for each of the first and one or more additional groups, the number n, $n_e$ of resources that it comprises and the size m, $m_e$ or $m_l$ of the corresponding first or additional subpart; an optional definition of the one or more hash functions; an optional type of extension of the Bloom filter between for example FIG. 2 and FIG. 3.

The augmented Bloom filter reconstruction module 530 thus reconstructs the extended Bloom array of FIG. 2 or 3.

The availability check module 540 is configured to determine whether a given resource is available in the communication device 400 using the obtained augmented data structure, i.e. the reconstructed extended Bloom array and associated hash functions.

To perform such a check, module 540 is able to use an importance criterion to determine whether the given resource is a normal resource or an important resource, and then to use the hash module 550 to obtain corresponding hash values in order to determine the availability of the resource thanks to conventional Bloom filter-based verification (all corresponding Boolean values set to 'true' or not).

The check result from the availability check module 540 is sent to the application module 510, based on which the latter may decide whether to take action or not to send the given resource to the communication device 400 or to request the given resource from the communication device 400.

Figure 6:
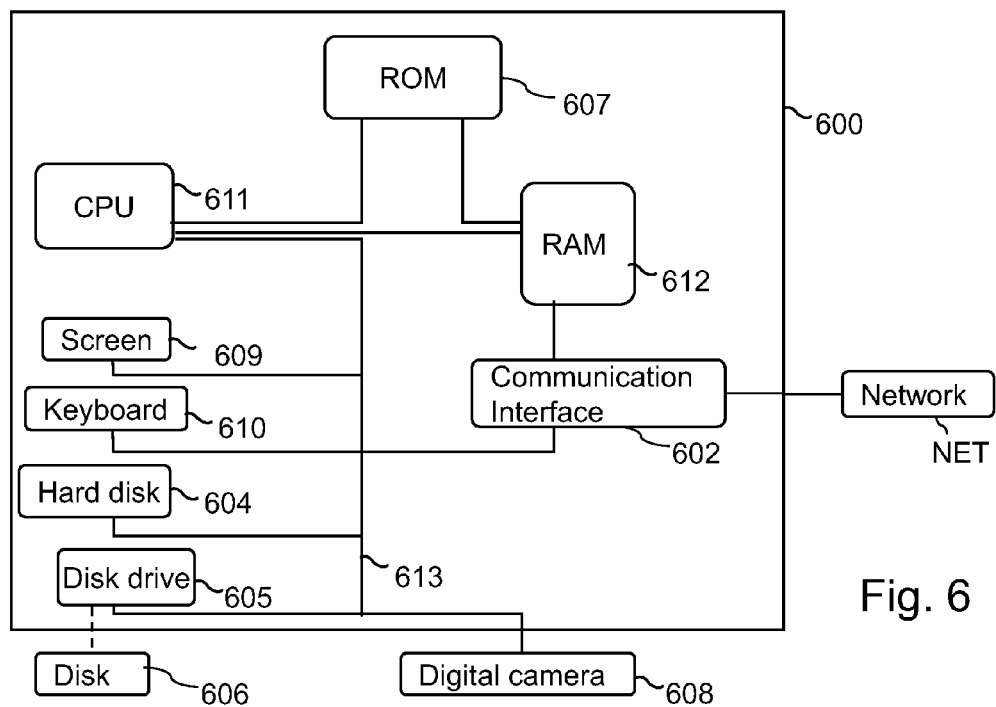
FIG. 6 is a block diagram illustrating components of a communication device in which embodiments of the invention may be implemented.

FIG. 6 schematically illustrates a communication device 600, either the client device C or caching server device CS of FIG. 4, or the server device S of FIG. 5, or a device embedding both functionalities, configured to implement at least one embodiment of the present invention. The communication device 600 may be a device such as a micro-computer, a workstation or a light portable device. The communication device 600 comprises a communication bus 613 to which there are preferably connected:
- a central processing unit 611, such as a microprocessor, denoted CPU;
- a read only memory 607, denoted ROM, for storing computer programs for implementing the invention;
- a random access memory 612, denoted RAM, for storing the executable code of methods according to embodiments of the invention as well as the registers adapted to record variables and parameters necessary for implementing methods according to embodiments of the invention; and
- a communication interface 602 connected to the communication network NET over which a client-server based communication can be implemented. The communication interface is provided to send requests or responses, such as HTTP requests/responses including digital resources, possibly in the Push or Pull model of communication, as well as to receive the requests or responses.

Optionally, the communication device 600 may also include the following components:
- a data storage means 604 such as a hard disk, for storing computer programs for implementing methods of one or more embodiments of the invention and for storing digital resources that can be requested by a client device, during the implementation of one or more embodiments of the invention, and for implementing a cache memory when required;
- a disk drive 605 for a disk 606, the disk drive being adapted to read data from the disk 606 or to write data onto said disk;
- a screen 609 for displaying data such as a web page in the case of the client device and/or serving as a graphical interface with a user, by means of a keyboard 610 or any other pointing means.

The communication device 600 can be connected to various peripherals, such as for example a digital camera 608, each being connected to an input/output card (not shown) so as to supply data to the communication device 600.

The communication bus provides communication and interoperability between the various elements included in the communication device 600 or connected to it. The representation of the bus is not limiting and in particular the central processing unit is operable to communicate instructions to any element of the communication device 600 directly or by means of another element of the communication device 600.

The disk 606 can be replaced by any information medium such as for example a compact disk (CD-ROM), rewritable or not, a ZIP disk or a memory card and, in general terms, by an information storage means that can be read by a microcomputer or by a microprocessor, integrated or not into the communication device, possibly removable, and adapted to store one or more programs whose execution enables a method according to the invention to be implemented.

The executable code may be stored either in read only memory 607, on the hard disk 604 or on a removable digital medium such as for example a disk 606 as described previously. According to a variant, the executable code of the programs can be received by means of the communication network NET, via the interface 602, in order to be stored in one of the storage means of the communication device 600, such as the hard disk 604, before being executed.

The central processing unit 611 is adapted to control and direct the execution of the instructions or portions of software code of the program or programs according to the invention, which instructions are stored in one of the aforementioned storage means. On powering up, the program or programs that are stored in a non-volatile memory, for example on the hard disk 604 or in the read only memory 607, are transferred into the random access memory 612, which then contains the executable code of the program or programs, as well as registers for storing the variables and parameters necessary for implementing the invention.

The execution of the program or programs instantiates software modules implementing specific functions, for example the modules as described above with reference to FIGS. 4 and 5.

In this embodiment, the device is a programmable apparatus which uses software to implement the invention. However, alternatively, the present invention may be implemented in hardware (for example, in the form of an Application Specific Integrated Circuit or ASIC).

The efficiency of the augmented Bloom filter of the invention in the course of providing a variable false-positive rate that is improved for a specific kind of resources (e.g. important) is now illustrated through FIGS. 7 and 8.

Experiments have been conducted onto the two augmented Bloom filters shown in FIGS. 2 and 3. In both cases, the false-positive rate was studied when the number of resources represented by the augmented Bloom filter varies from 10 to 50, with 10% of them being important resources.

FIG. 7 shows the false-positive rate depending on the size of the resources for which an availability check is conducted (the resource size is the criterion to discriminate between normal resources and important resources). FIG. 8 shows a weighted average false-positive rate, using the size of each resource as a weight when computing this average.

The "conventional" reference in the Figures refers to conventional Bloom filters as known in prior art. For comparison, the performance is provided of a first conventional Bloom filter designed with 10 bits per resource (i.e. m/n=10) and of a second one designed with 11 bits per resource.

The "ABF1" reference in the Figures refers to the augmented Bloom filter according to FIG. 2, while "ABF2" refers to the augmented Bloom filter according to FIG. 3. Both augmented Bloom filters are designed with a 10-bits-per-resource first subpart and a 5-bits-per-important-resource additional subpart (defining the extension of the first subpart for the important resources). It is noted in the Figures through the reference [10, 15].

In FIG. 7, three measurements for ABF1 and ABF2 are plotted depending on the size of the requested resources: the error-rate for small resources (referenced "small" in the Figure), the error-rate for large resources (referenced "large" in the Figure), and the average error rate (i.e. an overall performance).

For the small resources, the ABF performances are close to the performance of the conventional Bloom filter. This is because the majority of the availability checks relies on the first subpart of the extended Bloom array, i.e. on a conventional Bloom filter without taking advantage of the extension of the array according to the invention.

The performances for large resources are significantly better than the performances obtained with the conventional Bloom filters (either with 10 or 11 bits per resource). This shows that the extension of the Bloom array according to the invention provides significant improvement in reducing the false-positive rate of important resources (here large resources). One may note that ABF2 performance is not as good as that of ABF1 and that its performance is quite close to the performance of the conventional 11-bits Bloom filter.

At last, the average performance of ABF1 and ABF2 is somewhat better, but not in a statistically significant way, than that of the conventional 10-bits Bloom filter.

In FIG. 8, the average performance of both ABF1 and ABF2, when taking into account the resource size, are shown to be significantly better than the performance of the conventional 10-bits-per-resource Bloom filter.

ABF1 also provides better overall performance than a wider conventional Bloom filter, here the 11-bits-per-resource Bloom filter. ABF2 is close to the performance of the 11-bits-per-resource Bloom filter.

These plots show that ABF1 is better than ABF2 and is also better than a more precise conventional Bloom filter as the proportion of important resources increases.

The table below summarizes the results of FIG. 8 (10 resources including one important resource)

TABLE 1

|  | Conventional | | ABF1 (+5 bits) | ABF2 (+5 bits) |
|---|---|---|---|---|
|  | 10 bits | 11 bits | | |
| Total size of the Bloom Filter | 100 bits | 110 bits | 105 bits | 105 bits |
| Error rate (%) | 2.16 ± 0.50 | 1.91 ± 0.69 | 1.43 ± 0.49 | 1.83 ± 0.46 |

The above-mentioned SPDY-based example implementing the invention is now described with reference to FIGS. 9 to 12.

Figure 9:
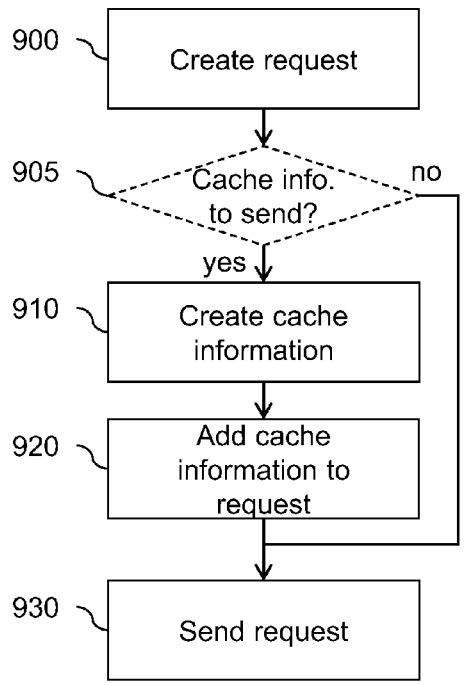
FIG. 9 is a flowchart illustrating general steps for a client device to request a main digital resource from a server device according to embodiments of the invention.

FIG. 9 is a flowchart illustrating general steps for a client device (e.g. a web browser) to request a main digital resource from a server device according to embodiments of the invention.

At step 900, the client device C creates a new request for obtaining a main resource or a web page from the server device S.

At step 910, the client device C creates its own cache information, for example a representation of its cache memories using an augmented Bloom filter according to the invention. This step is described in details below with reference to FIG. 10.

Following step 910, step 920 consists for the client device C to add the cache information to the request.

The sent cache information has to be exhaustive enough to make it possible for the server device S to reconstruct the same augmented Bloom filter (in particular the extended Bloom array and the corresponding hash functions) and to be able to conduct the availability check.

The sent cache information, also referred above as "data structure information", is made of the mapping data structure itself, i.e. the extended Bloom array as shown in FIG. 2 or 3, and of additional information or characteristics describing the augmented Bloom filter. As briefly set out above, the additional characteristics may comprise an optional importance criterion to discriminate between resources of the first and one or more additional groups; for each of the first and one or more additional groups, the number n, $n_e$ of resources that it comprises and the size m, $m_e$ or $m_i$ of the corresponding first or additional subpart; an optional definition of the one or more hash functions; an optional type of extension between ABF1 and ABF2.

The cache information can be encoded and stored in the header of the request, for example in an HTTP header that is safely handled by SPDY.

An exemplary header syntax is now given for purposes of illustration, where the header is labeled "Client-Cache-Content".

Header=Client-Cache-Content: [criteria;]* Nsize, Nnumber; filterContent

In this exemplary header syntax, the header starts with a definition of the importance criterion or criteria that discriminate important resources from normal resources, if any.

The importance criteria field is followed by the definition of the normal part of the Bloom filter, i.e. of the first subpart: first the number of bits per resource is given ("Nsize", i.e. m/n for FIG. 2 or $m/n_s$ for FIG. 3), then the number (n or $n_s$) of normal resources represented by the Bloom filter is given ("Nnumber"). Last, the Bloom array of Boolean values, be it an extended Bloom array or not, is encoded ("filterContent").

The Bloom array can for example be encoded either as hexadecimal values or using a base64 binary encoding to obtain greater compactness.

Each importance criterion that is specified is defined through three items of information: criteria=Ctype, Csize, Cnumber The three items of information are repeated for each importance criterion, i.e. to define each additional group of important resources. If several importance criteria are defined, a plurality of additional groups of resources with different levels of importance have thus been created.

The "Ctype" information defines which type of criterion is used. And several criteria can be used to determine the importance of a resource.

A first criterion is the size of the resource. This is because a large resource will take more time to be downloaded and therefore its sending to the client device C should be started as soon as possible. A false positive for a large resource means delaying the start of sending, therefore also the end of sending, and therefore most probably the time at which the client device will receive all the resources needed to render a requested main resource.

A second criterion is the type or usage of the resource.

For example, a missing image in a requested web page means that this image cannot be displayed. However, the requested web page that references the image can still be displayed with a place-holder. This is not perfect, but makes it possible to give fast and mostly correct feedback to the user.

On the contrary a missing CSS document prevents correct layout and rendering of the page. Although the requested web page could be rendered without the CSS document, its appearance could be very different from its final appearance, potentially disturbing the user.

In a similar way, a JavaScript file can add functionalities to a web page that will not be available until the file is received, parsed and executed. For the less intrusive JavaScripts, this may not be perceived by the user (some dynamic function may not be available), but for heavier JavaScripts this can prevent the web page being correctly rendered (a part of the page may not be displayed).

From these examples, the "Ctype" information can either be "css" (standing for CSS document), "js" (standing for JavaScript file) or the size "Rsize" of the resource. In this last case, a corresponding "limit" is specified, either using a size in KB or MB, or using a power of 2: Ctype="css"|"js"|"Rsize=" limit The "Csize" information defines the number $m/n_e$ of additional bits per important resource for that specific criterion.

And, the "Cnumber" information defines the number $n_e$ of important resources for that specific criterion.

An advantage of this modular definition of the augmented Bloom filter is that it is still compliant with a definition of a conventional Bloom filter.

A first example of a header based on this syntax is given corresponding to a conventional Bloom filter with 10 bits per resource and 23 resources:

Client-Cache-Content: 10, 23; XXXXX

"XXXXX" schematically represents the encoded Bloom array of Boolean values.

A second example of a header based on this syntax is now given corresponding to an augmented Bloom filter based on two groups of important resources in addition to the group of normal resources:

Client-Cache-Content: js,2,5; size=1 MB,10,2; 8,31; XXXXX

In this second example, the normal resources are represented by a 8-bits-per-resource first subpart of the extended Bloom array and comprise 31 resources. This first subpart is common to the two groups of important resources.

The first group of important resources is defined for JavaScript documents, uses 2 additional bits per resource and contains 5 resources.

The second group of important resources is defined for large files having a size greater than or equal to 1 MB, uses 10 additional bits per resource and contains 2 resources.

"XXXXX" schematically represents the encoded double-extended Bloom array.

Back to FIG. 9, step 920 is followed by step 930 where the client device C sends the request including the augmented Bloom filter to the server device S.

To keep this request for a main resource as small as possible and thus make it faster to send, the above header can be split into chunks and sent in the request and subsequent messages to the server device S. This is particularly suitable for SPDY where in the same current network connection, S and C can exchange a plurality of messages.

For example, the first request message may contain only the fact that some cache information is present, and possibly the additional characteristics of the augmented Bloom filter.

Using this message, the server device S can start preparing the response.

Next, the remainder of the augmented Bloom filter description is included in one or more subsequent messages from the client device. The subsequent messages may take more time to be sent. But this is not detrimental for the server device which will wait for them since it is aware that such additional information will arrive. During the wait, the server device can start sending the requested main resource to the client device which in most cases should be sent.

As shown by the dotted line of step 905 in FIG. 9, an optional step 905 can be provided prior to creating cache information. This optional step may consist in determining whether or not to include the cache information in the request message based on one or more criteria. This is because in some cases it is not worth including cache information, for example because the server device already has it.

To illustrate some situations, if the client device C has a persistent connection with the server device S and has already sent to it cache information, sending new cache information may not be necessary. The decision in that situation may be based on history information specifying that cache information has already been sent to the server device.

In another situation, if the request is for a main resource that does not reference any secondary resources therein (e.g. images, scripts, etc.), the cache information may prove not to be necessary for the server device S.

This is for example the case if S mainly uses the cache information to determine not yet available secondary resources to be pushed to C. A request for some updated data in the JSON format (e.g. for up-to-date stock quotes, or for recent tweets) generally returns one resource without any link to other secondary resources.

In this situation, it is then not necessary to include the cache information in the request.

The decision whether or not to include the cache information in the request may be based on:
  the above-mentioned history information; and/or
  the expected type of the result (for example a JSON document, or an image because it usually does not contain any other secondary resource); and/or
  the source of the request. For a URL given by the user (directly or through a bookmark), the cache information should probably be included. For a URL extracted from a received resource, or for a request generated by some JavaScript code, the client C has already made some requests to the server and therefore it is not necessary to include cache information; and/or
  statistics on the URL of the request.

Figure 10:
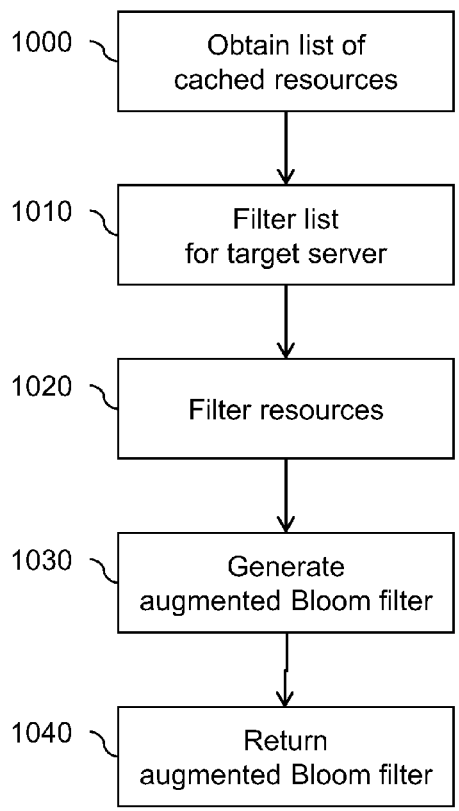
FIG. 10 is a flowchart illustrating steps for the client device to create cache information during the process of FIG. 9.

FIG. 10 is a flowchart illustrating steps for the client device C to create cache information, i.e. to create the augmented Bloom filter during above step 910.

The cache information creation process starts at step 1000 by obtaining a set Σ of resources stored in cache memories of the client device C.

This may be done by getting all the resources present in the client caches, as well as the metadata associated with them (e.g. a URL, a validity date . . . ).

Next, steps 1010 and 1020 consist in filtering the resources into a subset Σ' to keep only the relevant resources Optional step 1010 selects the resources that were served by the server device S for which the request is intended. This is to reduce as much as possible the number of resources to represent by the augmented Bloom filter, and thus to reduce the size of that augmented Bloom filter.

Step 1020 performs filtering based on one or more criteria relating to the resources themselves.

A cache validity criterion may firstly be used, i.e. a cache validity item of information associated with each resource of the set Σ.

A straightforward approach is to remove all the resources whose associated expected cache validity has expired, because they are liable to be out-of-date.

But, in most cases, the true validity of a resource is longer than its published expected cache validity. This is to prevent a client device from continuing using a resource that has been changed on the server.

As a consequence, more lax validity criteria can be implemented.

For example, the expected cache validity could be extended either by a predefined duration, or expanded by a predefined factor. Resources without any cache validity (i.e. that should not be cached) can be nonetheless cached with predefined expected cache validity duration.

In addition, statistics about each resource can be obtained to more precisely determine its true validity.

For example, the cache validity associated with a resource may be updated based on a time between two successive downloads of different versions of that resource and optionally on (an uncertainty measure defined by) a time between a last version check followed by a subsequent download and the subsequent download.

To be more precise for each resource, the last time it was downloaded, and the last time it was checked for validity can be saved in memory.

Then, when a resource is downloaded once again because it has changed, the time between the two downloads becomes its true validity, and the time between the last check and the new download is the uncertainty of this measure.

The expected validity of the new version of the resource can be set to this true validity modified by the uncertainty. For conservative results, the uncertainty or a fraction of it is subtracted from the true validity. For a more optimistic usage of the cache, the uncertainty can be discarded and the true validity can be multiplied by a predefined factor.

In addition, the starting date for the true validity can either be the last check or the new download, or somewhere in between.

This strategy can be slightly enhanced by storing in memory a few values of the true validity as it changes with time, and setting the expected validity as an average or weighted average of these stored true validities.

This strategy can also help determine which resources published as non-cacheable are really transient and which ones can nevertheless be kept in the cache.

A Bloom filter size criterion may secondly be used, in particular the size of the extended Bloom array as a function of one or more conditions applying to the resources of the set. The idea behind this is to avoid generating too big a Bloom filter.

A first approach is to tighten the conditions applying to the expected cache validity of the resources.

If this is not sufficient, the resource size can also be used to further discard some resources. For example, small resources are first discarded since the cost for sending them again is the lowest.

A third additional or alternative approach is to discard some resources based on their types. In the example where the augmented Bloom filter is used by the server device S to determine which secondary resources to push to C, the client device C generally requests main resources of type HTML and the secondary resources references therein are nearly never of type HTML. In this situation, the resource filtering should discard the HTML resources.

Again another approach is to base the filtering on link information representing the relationships between the resource and other resources.

Except the resources directly requested by the client device (usually the main HTML document of a web page), each other resource (in particular the secondary resources) is linked from another resource. These links can help determine whether a resource is specific to a web page or used by several web pages.

When storing resources in the cache memories of the client device C, the links between the resources can be preserved in an accessible format. This organizes all the resources in a tree whose roots are the resources directly requested by the client device.

Based on this tree, the number of incoming links can be computed for each resource. The filtering may be based on this number: if the number of links for a resource is sufficiently small, this resource and all the resources descending only from it in the tree are discarded.

The decision as to whether a number of links is sufficiently small can either be based on the absolute number of links coming directly or indirectly from a root resource: for example if a resource has only one incoming link from a root resource, it is probably specific to the web page corresponding to this root resource and can be safely discarded from the set $\Sigma$.

Another possibility is to use the relative number of direct incoming links depending on the number of root resources for the web site.

More sophisticated techniques can also be used by grouping root resources according to the path of their URL. This can help discover a family of web pages sharing a common set of resources. This then provides the possibility of keeping only these resources in the set $\Sigma$ (i.e. in the cache information sent) when requesting an unknown web page belonging to this family.

In addition, resources descending from the resource for which a request is made are not discarded, whatever their number of links.

Back to FIG. 10, to improve performance, steps 1000, 1010 and 1020 can be executed simultaneously.

After the resource filtering of steps 1010 and 1020, the subset $\Sigma'$ of relevant resources has been obtained.

Next, at step 1030, the augmented Bloom filter is generated from the subset $\Sigma'$, from the desired precisions m and $m_e$ or $m_l$ and from target false-positive rates p and $p_e$ or $p_v$. An indication of the extension type, i.e. between ABF1 and ABF2, can also be provided if appropriate.

The obtained augmented Bloom filter can either have the form of a conventional Bloom filter handling all its resources in the same way (no additional subpart is created), or include an extended Bloom array handling its resources depending on their importance.

Next to step 1030, step 1040 consists in returning the generated augmented Bloom filter, so that it can be added to the request to be sent.

Figure 11:
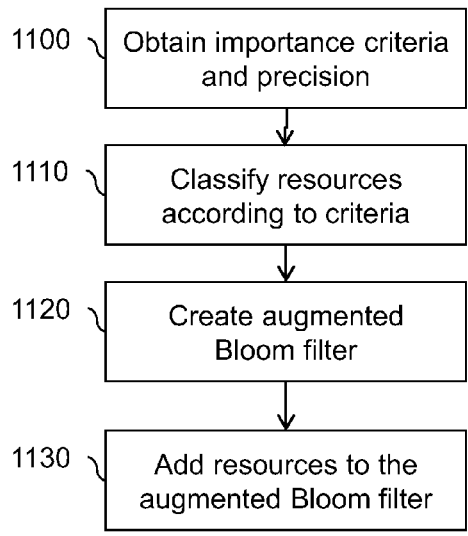
FIG. 11 is a flowchart illustrating steps for the client device to generate the augmented Bloom filter during the process of FIG. 10.

FIG. 11 is a flowchart illustrating steps for the client device C to generate the augmented Bloom filter. This corresponds to above step 1030.

At step 1100, the importance criterion or criteria to use and the target precisions for each level of importance as defined by corresponding criteria are obtained.

At step 1110, these criteria are used to split the resources of $\Sigma'$ into a first group of normal resources and one or more additional groups corresponding to one or more levels of resource importance as defined by the criteria.

Of course, if no importance criterion is provided a conventional Bloom filter will be created. In that case, steps 1100 and 1110 are not performed due to the absence of such criterion.

Then at step 1120, the augmented Bloom filter is created using the number of resources in each group and the target false-positive rate for each group (one group in case of absence of importance criterion, and two or more groups in case of one or more importance criteria). That means that the unknown Bloom filter characteristics are computed, for example the numbers k, $k_e$ of hash values, the precision m, $m_e$, $m_l$ of the first and additional subparts forming the extended Bloom array.

At step 1130, the resources of $\Sigma'$ are added to the created augmented Bloom filter, depending on the group to which they belong. This step comprises computing the hash values of each resource and mapping these hash values onto the extended Bloom array taking into account the mapping rules as defined above with reference to FIG. 2 or FIG. 3. In particular for each additional group of important resources, the extended information of the hash values (compared to the hash values of the normal resources—for example additional hash values $v_{k+1}$ to $v_{k+ke}$ in the case of ABF1 or the hash values belonging to $[m, m_I-1]$ in the case of ABF2) is mapped onto the additional subpart specifically provided for that additional group.

The hash functions used can be a set of functions computed as a linear combination of two independent base hash functions. In this way, if $h_1$, and $h_2$, are two independent base hash functions, a set of k (or $k_e$, $k_v$) hash functions $g_i(e)$ can be obtained in the following way:

$$g_i(e)=h_1(e)+i\times h_2(e)\ i\in[1,k]\ (or\ k_e, k_v)$$

Other combinations of the two base hash functions are possible, for example by adding a third term depending only of the index i of the generated hash function.

Using such two base hash functions for generating the set of k (or $k_e$, $k_v$) hash functions used by a Bloom filter has no impact on the Bloom filter performance.

In addition, it brings some advantages. For example, when a new resource or a new version of a resource is added into the cache memories of the client device, the two base hash functions are computed for it and stored with the metadata associated with that resource. In this context, these two base hash functions are computed only once for a given resource. This is advantageous since computing a hash function can be costly because it needs at the minimum to read the whole resource content.

Then when a Bloom filter is computed, depending on its precision, the number of bits per element is obtained, and also the number k, $k_e$ or $k_v$ of hash functions to use.

For each resource to add to the filter, the values of these k, $k_e$ or $k_v$ hash functions are computed from the stored two base hash values. This means that for each resource, computing the k, $k_e$ or $k_v$ hash functions is roughly equivalent to executing k, $k_e$ or k, additions, k, $k_e$ or $k_v$ multiplications, and k, $k_e$ or $k_v$ modulo operations (for reducing the hash values to the size of the array of Boolean values making the Bloom filter).

In a particular embodiment, the one or more hash functions compute hash values for a resource from input that comprises a key identifying the resource, in particular from the concatenation of the content of the resource with a Uniform Resource Locator (URL) identifying the resource.

Using only the content of the resource is also possible, but disadvantageously prevents differentiating two resources whose content is equal but whose URLs are different.

Figure 12:
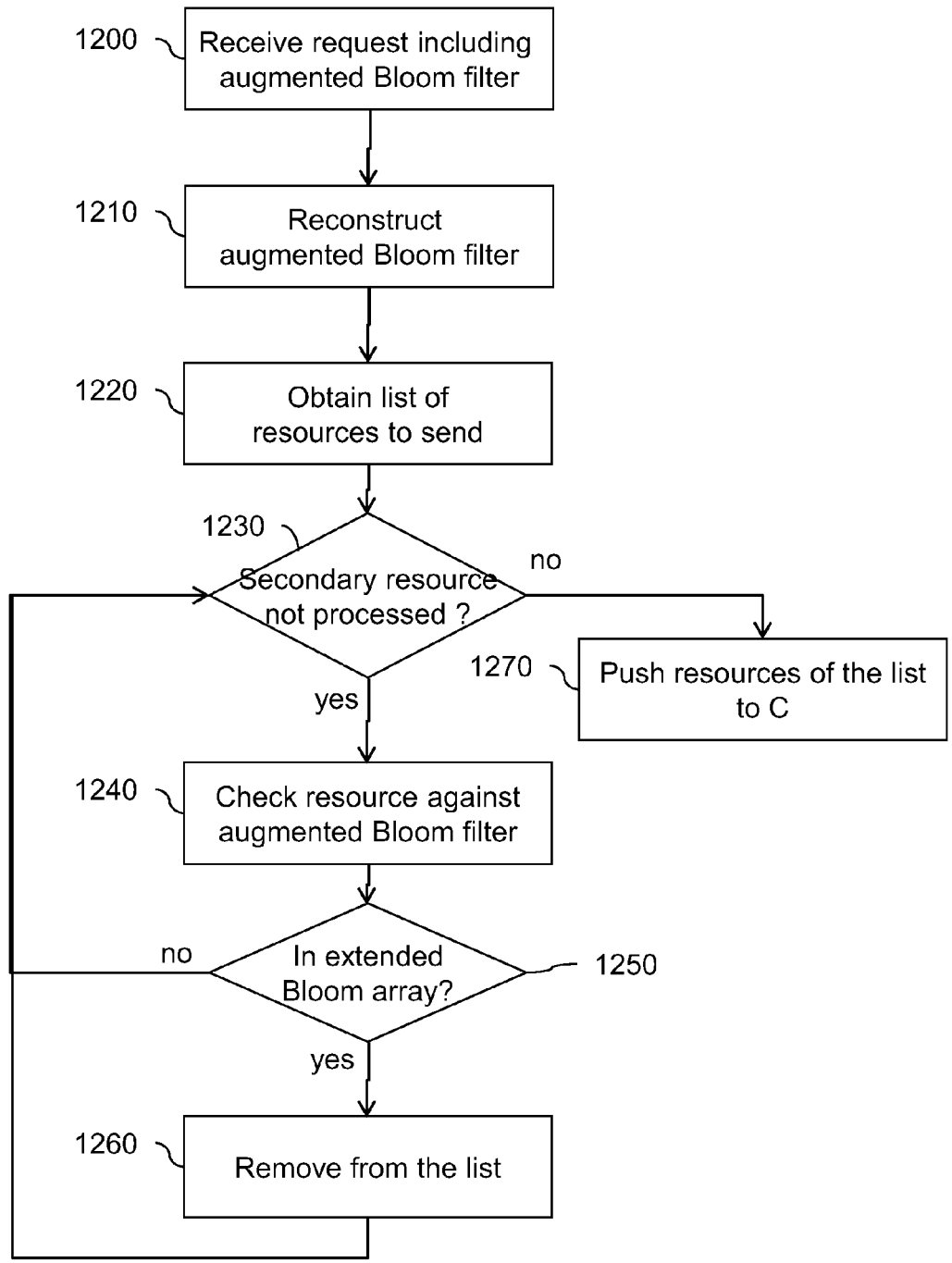
FIG. 12 is a flowchart illustrating steps for the server device to use the augmented Bloom filter provided by the client device through the process of FIG. 9.

With reference to FIG. 12, the use of the augmented Bloom filter by the server device C is now described. In the above SPDY-based example, the augmented Bloom filter has been provided from the client device C, within a request for a main resource. As already mentioned, another approach is to consider a caching server device CS that supplies the server device S with its cache information so that S can request CS for any resource S needs.

At step 1200, the server device S receives a request including an augmented Bloom filter.

At step 1210, the server device S extracts Bloom filter information and request information from the request and reconstructs the augmented Bloom filter.

The Bloom filter information makes it possible for S to know the size m, $m_e$, $m_I$ of each first and additional subparts composing the extended Bloom array.

It also make it possible for S to be aware of what kind of extension has been used (ABF1 or ABF2), of the criteria to discriminate important resources from normal resources, and of the number k, $k_e$, $k_v$ of hash functions to be used for the normal resources and the important resources.

Based on the request information, the server device S obtains, at step 1220, a list made of the requested main resource and of all the secondary resources associated with the main resource (e.g. secondary resources referenced within the main resource). These secondary resources are needed by C to correctly render the main resource.

The main resource can be sent automatically to C without checking that it is available in C. Otherwise, in case of false positive, the client device could not obtain the missing resource.

For each secondary resource (test 1230), it is filtered using the reconstructed augmented Bloom filter, at step 1240.

This means that the level of importance of the resource is first determined, then hash values are computed using the hash functions associated with the determined level of importance (i.e. group), and the Boolean values having the computed hash values as index are checked, taking into account the mapping rules as defined above with reference to FIG. 2 or FIG. 3 in particular regarding the extended information of the hash values (compared to the hash values of the normal resources).

If the augmented Bloom filter contains the resource (test 1250—all Boolean values are 'true'), the resource is removed from the list obtained at step 1220 since it should not be sent. This is step 1260.

After step 1260 or if the augmented Bloom filter does not contain the resource, the process loops back to step 1230. This means that if the augmented Bloom filter does not contain the resource, the resource is kept in the list for it to be sent later on.

When no secondary resource remains to be processed, the process goes to step 1270 where the secondary resources remaining in the list are pushed to C by S, in particular in the current SPDY network connection.

As an option, a message can be sent from S to C that states that the secondary resources removed from the list at step 1250 have not changed. This is to avoid C requesting them or checking their validity/version after having discovered they are needed when C parses the main resource. The server device S can also send some information to the client device C about the resources not sent, for example a response header including up-to-date cache information for the resource to make it possible for the client device C to keep up-to-date information about the cache validity of a resource and to extend it if necessary.

Similarly, if the main resource can automatically be sent to C without availability check, a variant may consist in checking the availability and sending a reply stating that the resource has not changed in case of positive availability check (already in C's cache memories).

Possibly, the server device S can prioritize the order of sending/pushing the different secondary resources, in order to make the responsiveness of the client device as fast as possible.

In the particular case of persistent network connection, as for SPDY, the client device C can potentially send a new request in the same network connection. In that case, the process for the server device S may skip steps 1200 and 1210, and instead of them, update the previously received augmented Bloom filter with the list of resources that have been sent to C in the current network connection. This reduces process complexity at the server device S.

Several solutions exist to memorize the resources sent to the client device S.

A first solution is to add them to the augmented Bloom filter reconstructed at step 1210. However, there is a risk of decreasing the performance of the augmented Bloom filter since it was optimized by the client device C to represent only C's cache memories at a given time.

Another solution is to either keep a list of the URLs of the resources sent to the client device C, or, for a more compact representation, to create a new Bloom filter, possibly augmented according to the invention or a conventional one, to represent those resources.

Preferably, this new Bloom filter is created so that it can contain resources sent to the client in further responses.

For long-lasting connections, the server device S should check whether the Bloom filter created for representing the resources sent to the client device C is full or not. Once it is full, a new Bloom filter should be created to represent the new resources sent to the client device.

For easier processing, a Bloom filter can be created for each group of resources sent to the client device, i.e. for each level of resource importance. This is because the size constraints are lighter in this situation than when there is a need to send the cache information from the client device C to the server device S. As a consequence, better precision can be used for this new Bloom filter.

In one particular embodiment, the decision to use the reconstructed augmented Bloom filter to filter the list of secondary resources may be subject to an opportunity criterion. Indeed, in some cases, there is no need to reduce the set of secondary resources. This is for example the case when the request from C contains some metadata indicating that a full reload of the main resource (e.g. web page) should be done. This is because in that case every secondary resource has to be sent again to the client device C.

FIG. 13 schematically illustrates the augmented Bloom filter when two or more additional groups of important resources are provided. This example is based on ABF1. One skilled in the art would adapt ABF2 without difficulty to this situation.

Different groups of important resources can be obtained by providing several size thresholds regarding the size of the resources. Of course, other importance criteria can be used.

Figure 13A:
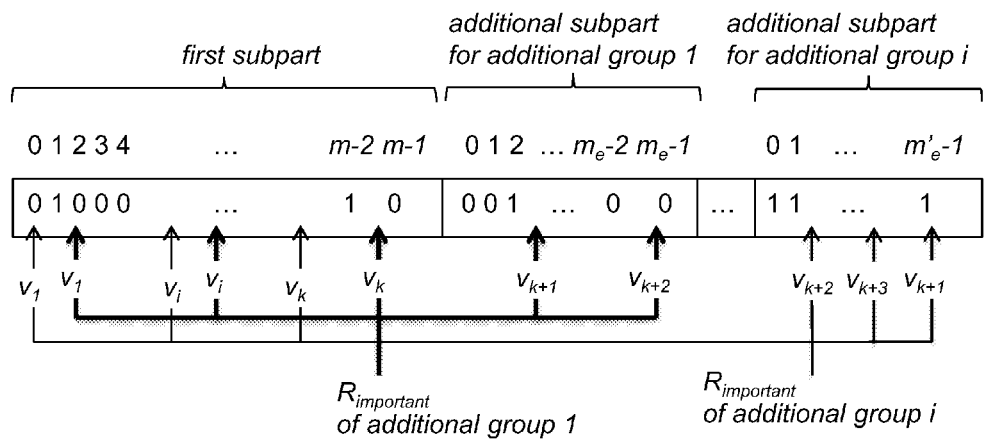
FIGS. 13A and 13B illustrate augmented Bloom filters according to the first embodiment of the invention of FIG. 2, respectively according to a first sub-embodiment where additional groups are independent one from the other and according to a second sub-embodiment where additional groups are hierarchically interdependent.

In FIG. 13A, the additional groups are considered as independent from each other. As a consequence, there is no need for the additional subpart provided for an additional group to be used for another additional group.

This means that the hash values of an important resource are mapped onto the part of the extended Bloom array that comprises only the first common subpart and the additional subpart specific to the associated additional group. In other words, the additional hash functions of a given additional group are not used by another additional group.

Figure 13B:
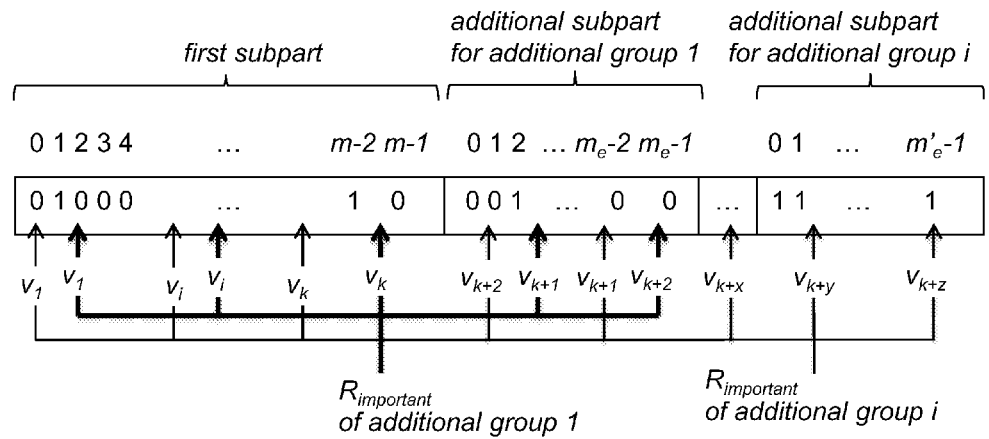

In contrast, in FIG. 13B, the additional groups are hierarchically organized (for example according to size thresholds) and the hash values for a resource of an additional group are mapped onto the part of the extended Bloom array that comprises the first common subpart and all the additional subparts assigned to the additional groups of lower importance level.

This means that each additional group extends the extended Bloom array of the additional group of previous lower importance level by adding new hash functions.

Although the present invention has been described hereinabove with reference to specific embodiments, the present invention is not limited to the specific embodiments, and modifications which lie within the scope of the present invention will be apparent to a person skilled in the art. Many further modifications and variations will suggest themselves to those versed in the art upon making reference to the foregoing illustrative embodiments, which are given by way of example only and which are not intended to limit the scope of the invention as determined by the appended claims. In particular different features from different embodiments may be interchanged, where appropriate.

The invention claimed is:

1. A method of generating and using an augmented data structure representing the availability of resources in a communication device, the method comprising:
providing a first group of resources available in the communication device and one or more additional groups of other resources available in the same communication device,
providing one or more hash functions for each of the first and additional groups of resources, and calculating one or more hash values for each resource using the one or more corresponding hash functions,
mapping each obtained hash value onto one entry of a data structure, wherein the hash values obtained from a resource of the first group are mapped onto a first subpart of the data structure only and the hash values obtained from a resource of an additional group are mapped onto a portion of the data structure including the first subpart and an additional subpart.

2. The method of claim 1, wherein the one or more hash functions associated with an additional group of resources includes the one or more hash functions associated with the first group of resources and one or more additional hash functions.

3. The method of claim 2, wherein the one or more hash values obtained using the one or more hash functions common to the first and additional groups are mapped onto the first subpart of the data structure, and the one or more hash values obtained using the one or more additional hash functions are mapped onto the additional subpart of the data structure.

4. The method of claim 1, wherein the one or more hash functions provided for the first group have values in a first range of values, and the one or more hash functions provided for an additional group have values in a range of values that includes and extends the first range.

5. The method of claim 4, wherein the first subpart of the data structure is arranged to map hash values belonging to the first range and the additional subpart of the data structure is arranged to map hash values extending beyond the first range.

6. The method of claim 5, wherein the one or more hash functions provided for an additional group comprise only the one or more hash functions provided for the first group but with values in an extended range of values.

7. The method of claim 5, wherein the one or more hash functions provided for an additional group comprise the one or more hash functions provided for the first group but with values in an extended range of values and comprise hash functions additional to the one or more hash functions provided for the first group.

8. The method of claim 1, further comprising obtaining a set of resources stored in memories of the communication device and filtering the obtained set according to at least one filtering criterion to reduce the set to a subset of relevant resources.

9. The method of claim 8, wherein the at least one filtering criterion comprises the origin of the resource.

10. The method of claim 8, wherein the at least one filtering criterion comprises a cache validity associated with each resource of the set.

11. The method of claim 8, wherein the at least one filtering criterion comprises the size of the data structure as a function of one or more conditions applying to the resources of the set.

12. The method of claim 11, wherein the one or more conditions are selected from the set comprising: cache validity associated with each resource; a size of each resource; a type of each resource; and link information representing relationships between the resource and other resources.

13. The method of claim 8, further comprising:
splitting the subset of relevant resources into the first and additional groups of resources based on one or more criteria concerning the resources,
providing a target false positive rate for each group,
defining the first subpart of the data structure as a Bloom filter and one or more additional subparts as extensions of the Bloom filter based on respective numbers of resources per group and the respective target false positive rates.

14. The method of claim 1, wherein resources available in the communication device are split into the first and additional groups of resources based on one or more criteria concerning the resources selected from the set comprising:
a size of each resource,
the impact of each resource in the rendering of a main resource, wherein the resources are secondary resources referenced within one or more main resources requested by the communication device, including the appearance of the rendering or the functionalities during the rendering as perceived by a user, and
the time at which the communication device needs to process each resource.

15. The method of claim 1, further comprising including data structure information in a request message requesting a main resource from a server device.

16. The method of claim 15, wherein the data structure information comprises an optional importance criterion to discriminate between resources of the first and one or more additional groups; for each of the first and one or more additional groups, the number of resources that it comprises and the size of the corresponding first or additional subpart; an optional definition of the one or more hash functions; an optional type of extension defining the one or more hash functions provided for an additional group compared to the one or more hash functions provided for the first group; and the data structure including the first and one or more subparts.

17. The method of claim 15, further comprising beforehand determining whether or not to include the data structure information in the request message based on one or more criteria selected from the set comprising: the inclusion in the requested main resource of references to one or more secondary resources; and history information specifying that data structure information has already been sent to the server device.

18. The method of claim 1, wherein the one or more hash functions are different combinations of the same two base hash functions available in the communication device along with the first and additional groups of resources.

19. A system for generating and using an augmented data structure representing the availability of resources in a communication device, the system comprising:
a memory; and
a processor, the processor configured to control:
a resource grouping module for providing a first group of resources available in the communication device and one or more additional groups of other resources available in the same communication device,
a hash module for providing one or more hash functions for each of the first and additional groups of resources, and for calculating one or more hash values for each resource using the one or more corresponding hash functions,
a mapping module for mapping each obtained hash value onto one entry of a data structure, wherein the hash values obtained from a resource of the first group are mapped onto a first subpart of the data structure only and the hash values obtained from a resource of an additional group are mapped onto a portion of the data structure including the first subpart and an additional subpart.

20. A non-transitory computer-readable medium storing a program which, when executed by a microprocessor or computer system in the communication device, causes the communication device to perform the steps of:
providing a first group of resources available in the communication device and one or more additional groups of other resources available in the same communication device,
providing one or more hash functions for each of the first and additional groups of resources, and calculating one or more hash values for each resource using the one or more corresponding hash functions,
mapping each obtained hash value onto one entry of a data structure, wherein the hash values obtained from a resource of the first group are mapped onto a first subpart of the data structure only and the hash values obtained from a resource of an additional group are mapped onto a portion of the data structure including the first subpart and an additional subpart.

* * * * *